United States Patent
Yasuda et al.

[11] Patent Number: 5,902,489
[45] Date of Patent: May 11, 1999

[54] PARTICLE HANDLING METHOD BY ACOUSTIC RADIATION FORCE AND APPARATUS THEREFORE

[75] Inventors: Kenji Yasuda, Hatoyama-Machi; Shin-ichiro Umemura, Hachioji; Kazuo Takeda, Tokorozawa; Mitsuru Tamura, Kawagoe; Norio Shimizu, Sayama, all of Japan

[73] Assignee: Hitachi, Ltd., Tokyo, Japan

[21] Appl. No.: 08/745,656

[22] Filed: Nov. 8, 1996

[30] Foreign Application Priority Data

Nov. 8, 1995 [JP] Japan .................................. 7-290010

[51] Int. Cl.⁶ .......................... B01D 17/06; B01D 35/06; B01D 43/00
[52] U.S. Cl. .......................... 210/748; 210/94; 210/175; 210/188; 210/198.1; 210/222; 210/243; 210/294; 210/319; 366/127; 209/155; 204/660; 204/661; 204/664; 96/1; 96/15; 96/155; 96/389
[58] Field of Search ........................... 209/155; 366/127; 204/660, 661, 664; 96/115, 389, 155; 210/748, 702, 774, 94, 138, 175, 188, 222, 243, 294, 319, 513

[56] References Cited

U.S. PATENT DOCUMENTS

| | | | |
|---|---|---|---|
| 4,205,966 | 6/1980 | Horikawa ................................ | 210/748 |
| 4,523,682 | 6/1985 | Barmatz et al. . | |
| 4,743,361 | 5/1988 | Schram ................................... | 210/748 |
| 4,759,775 | 7/1988 | Peterson et al. ........................ | 210/748 |
| 5,225,089 | 7/1993 | Benes et al. . | |
| 5,527,460 | 6/1996 | Trampler et al. ....................... | 210/748 |

FOREIGN PATENT DOCUMENTS

| | | |
|---|---|---|
| PCT/WO85/01892 | 5/1985 | WIPO . |
| PCT/WO90/05008 | 5/1990 | WIPO . |

OTHER PUBLICATIONS

"Acoustical Tweezers" J. Wu, J. Acoust. Soc. Am (1991), pp. 2140–2143.
"Acoustic Radiation Pressure On A Compressible Sphere" Yoshioka et al, vol. 5 (1995) pp. 167–173.
"Acoustic Radiatin Pressure on Bubbles and Their Logarithmic Decrement" by K. Yosioka et al Acustica vol. 5(1995) 173–178.
"Separation Devices based on forced Coincide Response of Fluid–Filled Pipes", by T.L. Tolt et al, Acoust, Soc. am. 91(1992) 3152.
"Fraction of Suspensions Using Synchronized Ultrasonic and Flow Fields", by A. I. Madralis et al, AIChE J. 39(1993) 197.

(List continued on next page.)

Primary Examiner—David A. Reifsnyder
Attorney, Agent, or Firm—Antonelli, Terry, Stout & Kraus, LLP

[57] ABSTRACT

A chamber for exerting an ultrasound beam on a sample solution containing particles to be concentrated, separated or arranged is provided with a view toward arbitrarily controlling the shape of a spatial distribution of potential energy created by the ultrasound beam and concentrating, separating or periodically arranging the particles. In contrast to the chamber, irradiation ultrasound sources for generating ultrasound beams are provided to create an ultrasonic intensity distribution for producing a position potential energy distribution used to exert a force forwarded in a predetermined direction or a force staying at a predetermined region to each particle. Thus, a specific spatial distribution of potential energy can be realized by ultrasound beams each having a specific intensity, a specific frequency and a specific phase or an ultrasound beam formed by superimposing these on one another. Further, at least one suction hole for recovering separated solvents or particles is defined in a wall surface of the tube, which is orthogonal to the flow of the sample solution.

28 Claims, 18 Drawing Sheets

OTHER PUBLICATIONS

"Separation Of Dispersed Phase From Liquids in Accoustically Driven Chambers" T.L. Tolt et al, Chem. Eng. Sci. 48(1993) 527.

"Acoustic Radiation Pressure–Principles and Application to Separation Science", by R.E. Apfel, Proc. OF DAGA confer., May (1990), 19–36.

"Concetration and Fraction of Small Particles in Liquid by Ultrasound", by K. Yasuda et al, JPN. J. Appln. Phys. 34(1995), 2715–2720.

Table 6–2. Sonoluminenscences in the prescences in the presence of Different Gases, by R.E. Verrail, et al.

Rule 62 Continuation Application filed on Nov. 4, 1996, of U.S. Application Serial No. 08/163,290 filed Dec. 2, 1993.

Patent Abstract of Japan Publication No. 07047259 Publ. Date Feb. 21, 1995.

Patent Abstract of Japan Publciation No. 06241977A Publication Date: Sep. 2, 1994.

"Ultrasonic Continuous Flow Plasmapheresis Separator", H. Curtis, et al, IBM Technical Disclosure Bulletin, vol. 25, No. 1, Jun. 1982, pp. 192–193.

K. Yasuda, "Blood Concentration by Superposition of Higher Harmonics of Ultrasound", Jpn. J. Appl. Phys., vol. 36, (1997) pp. 3130–3135, Part 1, No. 5B, May 1997.

n = 10 n = 100 n=10 n=100

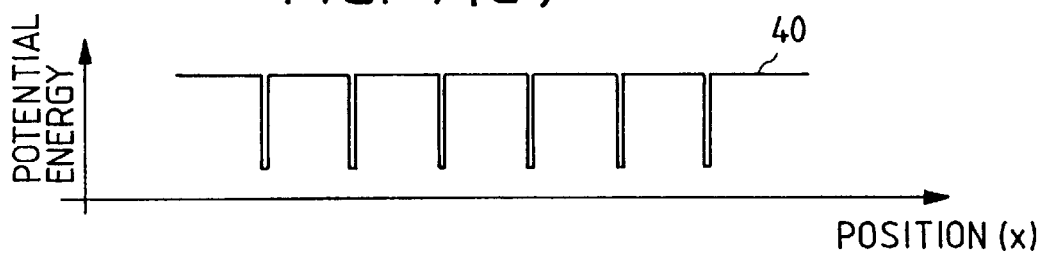
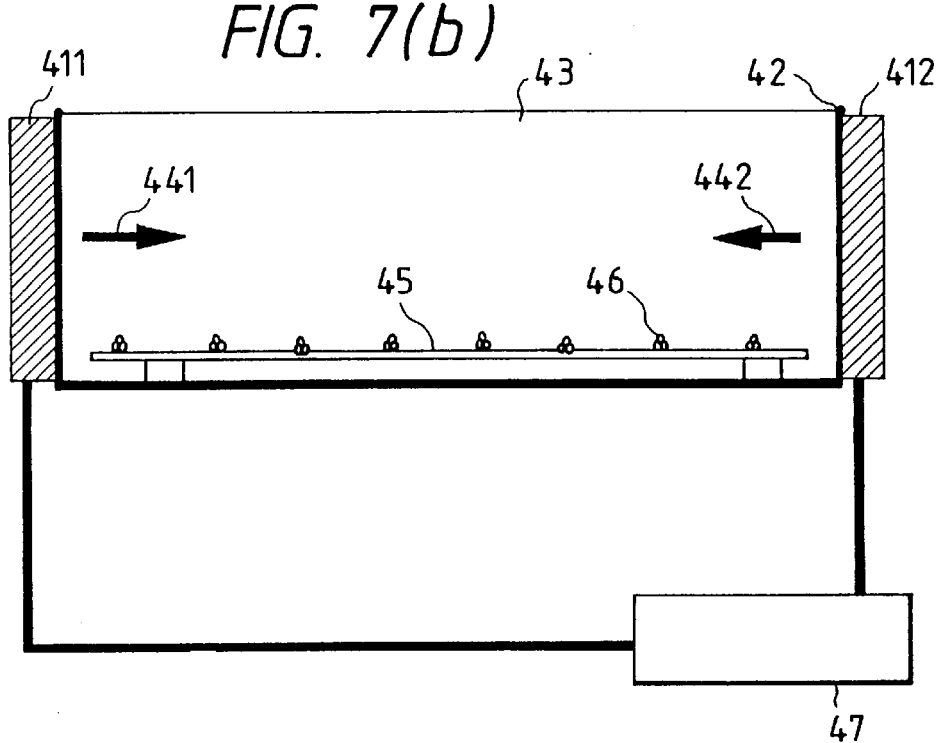
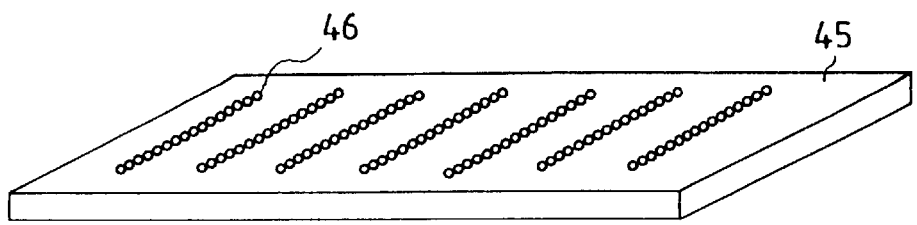

NODE OF ACOUSTIC PRESSURE

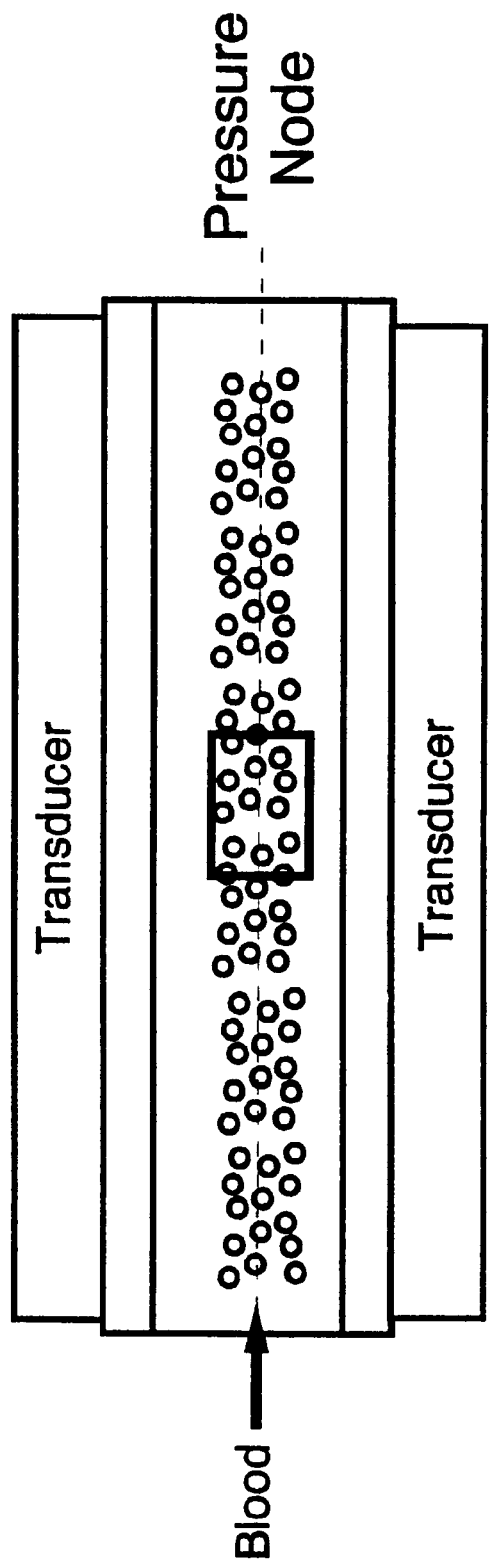

100μm

PARTICLE HANDLING METHOD BY ACOUSTIC RADIATION FORCE AND APPARATUS THEREFORE

BACKGROUND OF THE INVENTION

1. Field of the Invention

The present invention relates to a method of and an apparatus for concentrating, filtrating, separating and arranging particles and solutes in a fluid.

2. Description of the Related Art

It is necessary to exert some force on cells levitated in a solution without making direct contact with the cells with a view toward concentrating biomaterials such as the cells, etc. in non-contact form. An ultracentrifugation is known which uses gravity as the force referred to above. However, since it is necessary to rotate a tube with a sample held therein for a predetermined time at high speed upon its use with a view toward generating the gravity, a predetermined processing time interval is required regardless of any amount of a sample to be separated.

As a technique for directly capturing a very small quantity of sample, a technique using a light radiation force has been proposed by A. Ashkin et al. and has been patented as an optical trap device (see U.S. Pat. No. 4,893,886). However, light is not permeable into a solution in which particles exist therein in large quantity and whose particle density is high, and hence the present solution is not appropriate to concentrate a sample.

It has been reported by, for example, Junru Wu, "Acoustical tweezers", Journal of Acoustical Society of America, pp. 2140–2143, 89(5), May, 1991, saying an acoustic radiation force subjected to each particle, that when the acoustic radiation force is exerted on each particle, a polystyrene sphere having a diameter of 270 $\mu$m could be successfully captured at a focal point of a focused ultrasound beam. The principle of capturing of the particles by the acoustic radiation force has been described in the reference of "Acoustic radiation pressure on a compressible sphere", pp. 167–173 and "Acoustic radiation pressure on bubbles and their logarithmic decrement", pp. 173–178, ACUSTICA vol. 5 (1955) by Yoshioka et al. According to the reference, the magnitude of an acoustic radiation force in an ideal fluid, that each particle undergoes in a standing wave and a traveling wave, has been estimated.

As has been also disclosed in Japanese Patent Application Laid-Open No. 7-47259, a method of introducing at least one ultrasound beam into a tube in which a fluid has flowed, thereby continuously concentrating the particles on a certain range, or a method of recovering the focused particles has been also invented. Further, a particle separating device described in Japanese Patent Application Laid-Open No. 6-241977, for utilizing an acoustic radiation force and an electrostatic force together in combination to thereby separate and recover particles different in particle diameter from each other or particles different in material from each other, and a particle separating device disclosed in U.S. Pat. No. 4,523,682, for using an acoustic radiation force and gravity in combination to thereby separate and recover particles different in particle diameter or density from each other or particles different in material from each other have been also invented.

The principle of applying ultrasound beams of different frequencies in a superimposed state to thereby effectively generate bubbles at a focal point in a fluid has been also described in the "Ultrasonic symposium proceeding", pp.1843–1846 (1994), IEEE reported by Umemura et al.

SUMMARY OF THE INVENTION

The above-described conventional techniques show techniques each related to an apparatus capable of directing an ultrasound beam on particles so as to concentrate the particles or respectively separating and recovering particles in a fluid to specific ranges according to their physical properties by an ultrasound beam and an electric field. A technique for freely controlling the shape of a spatial distribution of potential energy created by the ultrasound beam has not been taken into consideration. Further, a technique for periodically arranging the particles has not been taken into consideration.

Although control on the temperature of a fluid containing a sample is of importance when a biosample is handled in particular, no consideration for the solution temperature control has been paid.

Further, a problem arises that a sound field in a chamber is disturbed by a separator or a suction tube introduced for particle separation and recovery and the efficiency of recovery of particles or a solvent is reduced. Moreover, a technique for continuously changing the type of solvent including these without reducing the particles in the fluid containing the particles has not been taken into consideration.

An object of the present invention is to provide a particle handling method by an acoustic radiation force and an apparatus therefor capable of easily realizing the following items:

(1) to freely control the shape of a spatial distribution of potential energy created by each ultrasound beam and freely control an intensity distribution of a radiation force that each particle in a fluid undergoes, (2) to concentrate the particles at a desired position and recover each concentrated particle, (3) to separate the particles in the fluid according to their physical properties such as sizes or materials and to collect them respectively according to their physical properties, (4) to measure the physical properties concentrated particles or separated particles, (5) to adjust the degree of concentration, separation or recovery of each particle, (6) to periodically arrange the particles, (7) to control the temperature of the fluid containing the particles, (8) to compensate for nonuniformity of the efficiency of conversion of a peak voltage to peak pressure according to a variation in the frequency to be used, (9) to efficiently recover the particles or solvent without a sound field in a chamber on which an ultrasound beam is directed, being not disturbed, and

(10) to allow the type of solvent in the fluid to be continuously replaced by another.

The present invention basically has means for simultaneously generating ultrasound beams of different intensities, frequencies and phases from one or a plurality of sources of ultrasound so as to superimpose the ultrasound beams on one another to thereby produce a freely-shaped spatial distribution of potential energy with a view toward freely controlling the shape of the spatial distribution of potential energy created by each ultrasound beam. Further, the present invention is realized by means for varying this spatial distribution of potential energy according to a variation in time. The present invention is realized by varying an amplification factor of an AC voltage according to a variation in frequency when a piezoelectric actuator is driven by the use of ultrasound beams of plural frequencies.

Moreover, the present invention is realized by applying ultrasound beams in the direction orthogonal to the flow of a solution within a chamber for passing a fluid containing particles to concentrate each particle and defining a suction hole for recovering separated solvents or particles in a wall surface of the chamber, which is orthogonal to the flow of the solution. The present invention is realized by providing a port for supplying a solvent to be replaced, at a position opposite to the suction hole.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 6 shows a first embodiment of the present invention applied to a particle continuous concentrating apparatus, in which

FIG. 7 shows a second embodiment of the present invention applied to an apparatus for concentrating particles and periodically arranging them at periodic positions, wherein FIG. 7(a) is a view showing a potential energy caused to act on particles within an ultrasonic chamber, FIG. 7(b) is a view illustrating the manner in which particles are concentrated on minimum points of potential energy created by an acoustic radiation force within the ultrasonic chamber, and FIG. 7(c) is a view typically showing the state of arrangement of particles on a substrate as viewed diagonally from above;

DETAILED DESCRIPTION OF THE PREFERRED EMBODIMENTS

According to the theoretical analysis about the radiation force given by the acoustic wave or ultrasound beam, which has been described in the "Acoustic radiation pressure on a compressible sphere", pp.167–173 and "Acoustic radiation pressure on bubbles and their logarithmic decrement" by Yoshioka et al, pp.173–178, ACUSTICA vol. 5 (1955) as has been mentioned even above, when a particle exists in a position spaced by a distance x from the position of the pressure node in the following equation indicative of a plane standing wave p(x) of a wave number vector k, for example:

$$p(x) = p_o + p_1 \cdot \sin(k \cdot x) \cdot \cos(\omega t) \quad (1)$$

the radiation force to which the particle is subjected, can be represented as follows:

$$F = -\left(\frac{4\pi}{3}\right) \cdot R^3 \cdot k \cdot E \cdot A \cdot \sin(2k \cdot x) \quad (2)$$

$$A = \frac{5\rho - 2\rho'}{2\rho + \rho'} - \frac{\gamma}{\gamma'} \quad (3)$$

where p(x) indicates acoustic pressure at a position x, $p_o$ indicates hydrostatic pressure, $p_1$ indicates peak pressure, $\omega$ indicates an angular frequency of an ultrasound beam, t indicates time, F indicates a radiation force given to the particle, by the ultrasound beam, R indicates a radius of the particle, k indicates a wave number of the ultrasound beam, E indicates an average energy density of the ultrasound beam, p indicates the density of the particle, p' indicates the density of a dispersion medium, $\gamma$ indicates compressibility of the particle, and $\gamma'$ indicates compressibility of the dispersion medium. When A is positive under the relationship between particles and a solvent, the particles will be concentrated on a pressure node of a standing wave. On the other hand, when A is negative, they will be focused on an anti-node (loop) thereof.

The known example referred to above shows the acoustic radiation force that acts on the particles under the presence of the plane standing wave having the wave number vector k. In the present invention, however, a means for creating spatial distributions of potential energy represented in free shapes superimposes ultrasound beams having a plurality of different intensities, phases and frequencies on one another so as to create a spatial distribution of intensities of the ultrasound beams, thereby producing a spatial distribution of potential energy having a specific spatial distribution.

Figure 1:
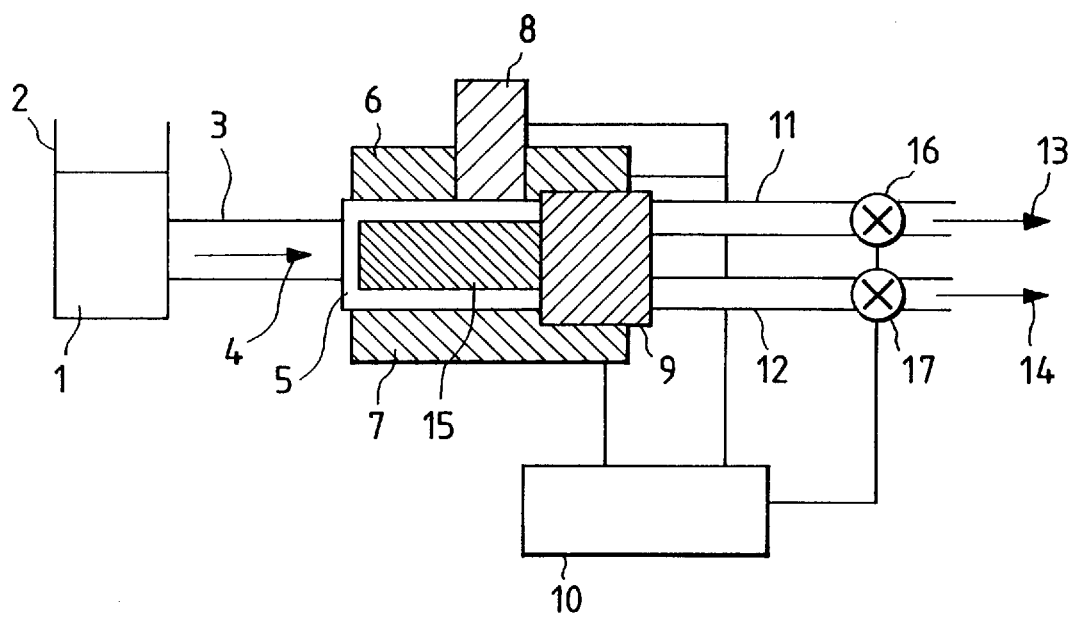
FIG. 1 is a conceptual view showing a basic configuration of the present invention applied to a particle continuous concentrating apparatus.

FIG. 1 is a conceptual view of a particle handling method by an acoustic radiation force and an apparatus therefor at the time that the present invention is applied to a particle continuous concentrating apparatus. The particle handling method by the acoustic radiation force and the apparatus therefor, according to the present invention will hereinafter be described by several embodiments with reference to the accompanying drawings.

The configurational example of the apparatus according to the present invention comprises a sample solution containing samples to be concentrated, filtrated and arranged, a tank 2 for storing the sample solution 1 therein, a chamber 5 for causing each ultrasound beam to act on the sample solution 1, ultrasound sources 6 and 7 disposed so as to contact the chamber 5 and disposed so as to introduce ultrasound beams of specific intensities, frequencies and phases or an ultrasound beam produced by superimposing these ultrasound beams on one another into the chamber 5 in order to create an ultrasound beam intensity distribution for producing a potential energy gradient for causing a force forwarded in a predetermined direction or a force that stays at a predetermined region to act on each particle in the chamber 5, a particle observing device 8 for measuring a distribution of each particle in the chamber 5, a particle separation device 9 capable of separating particles having different physical properties such as sizes or materials by exerting an acoustic radiation force and another external force other than the ultrasound beams, flow velocity control devices 16 and 17 for respectively adjusting the velocity for sucking the solution in the chamber 5 or the velocity for attracting each particle concentrated in the chamber 5, a temperature control device 15 for controlling the temperature of the chamber 5, and a control device 10 for controlling an ultrasound beam generated from each ultrasound source, an ultrasound beam in the particle separation device 9, another external force in the particle separation device, the temperature control device 15, and the flow velocity control devices 16 and 17, analyzing the result of observation by the particle observing device 8 and performing control on each generated ultrasound beam, another external force, the temperature and the flow velocity on the basis of the result of observation.

The solution 1 containing the samples is first introduced via a pipe into the chamber 5 in the direction indicated by arrow 4. Next, the solution 1 introduced into the chamber 5 is irradiated with the superimposed ultrasound beams. Thus, the particles can be focused onto a point where the potential is at the minimum, by a specific spatial distribution of potential energy created by the irradiated ultrasound beam. At this time, the temperature of the solution 1 in the chamber 5 can be held constant even during the irradiation of each ultrasound beam by controlling the temperature of the chamber 5 with the temperature control device 15. Further, when a biological sample is used, the solution temperature can be controlled to a solution temperature suitable for the sample. The effect of concentrating the sample can be continuously observed by the particle observing device 8 for observing the inside of the chamber 5. If it is found from the result of observation that the effect of concentrating the sample has not been obtained sufficiently, then the intensity of the ultrasound beam generated from each ultrasound source and the shape of the spatial distribution of potential energy can be changed under the control of the control device 10, and the velocity for sucking the solution 1 in the chamber 5 or the velocity for attracting the concentrated particles in the chamber 5 can be also adjusted under the control of the control device 10.

Figure 2A:
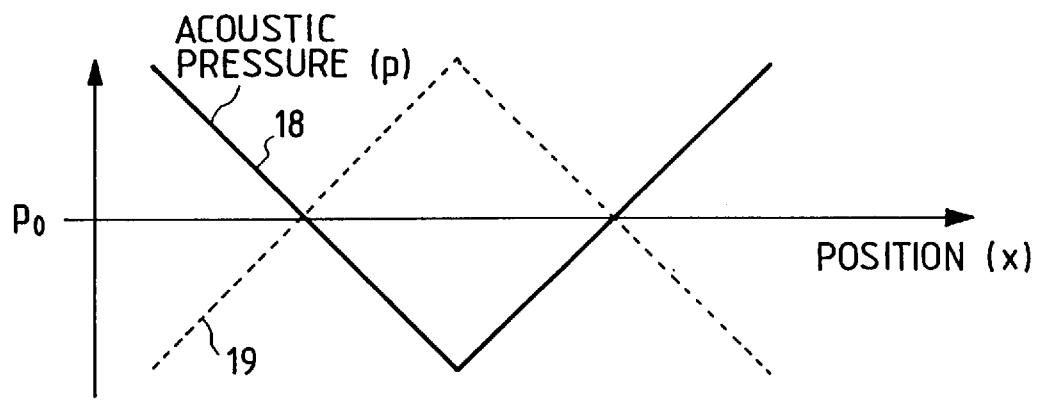
FIG. 2(a) is a graph for describing a spatial distribution of envelopes of acoustic pressure at the time that a standing wave corresponding to a triangular wave is produced in a chamber.

Next, since the particles introduced into the particle separation device 9 capable of separating the particles having the different physical properties by exerting the acoustic radiation force and another external force other than the ultrasound beams respectively have different balance positions according to the physical properties, they can be focused onto their corresponding balance positions. Thus, the measurement of a distribution of the particles in the chamber 5 by the particle separation device 9 permits a particle composition analysis such as the material or the particle-diameter distribution. Further, the particles each having specific composition can be also recovered by selectively recovering the particles gathered at their corresponding balance positions. The spatial distribution of potential energy produced in the chamber 5 permits the generation of a specific spatial distribution of potential energy by superimposing a plurality of ultrasound beams different in intensity, frequency and phase, which are applied to the chamber 5 from the ultrasound sources 6 and 7, on one another. By producing, in the chamber 5, a standing wave in which a distribution corresponding to the position of acoustic pressure is represented in the shape of a triangular wave as indicated by envelopes 18 and 19 in FIG. 2(a) by way of example, a potential energy distribution 20 shown in FIG. 2(b) can be created in the chamber 5. The acoustic radiation force subjected to each particle decreases as it gets closer to the node or anti-node (loop) of the standing wave in a potential energy distribution in such a simple sine wave as expressed in the equation 2, and the acoustic radiation force little acts on each particle in the vicinity of these. However, in a potential energy distribution of a triangular wave shown in FIG. 2(b), the radiation force dependent on coordinates is not attenuated and the radiation force subjected to each particle is kept substantially constant without depending on the coordinates. In order to produce such a gradient potential field of triangular wave type with each ultrasound beam, the intensities of a plurality of ultrasound beams of frequencies are adjusted according to their frequencies as given by the following equation and an ultrasound beam obtained by superimposing these on one another may be introduced into the chamber 5 from each of the ultrasound sources 6 and 7.

$$p = p_0 + p_1 \cdot \sum_{i=1}^{n} \frac{(-1)^{i+1}}{(2i-1)^2} \cdot \sin\{(2i-1)(k \cdot x - \omega t) + \delta\} \quad (4)$$

where p indicates an envelope of acoustic pressure at a position x, $p_o$ indicates hydrostatic pressure in the chamber, $p_1$ indicates peak pressure of the ultrasound beam, k indicates a basic wave number vector of the ultrasound beam, $\omega$ indicates a basic angular frequency of the ultrasound beam, and $\delta$ indicates a phase shift between a plurality of ultrasound beams produced from a plurality of ultrasound sources.

Figure 3A:
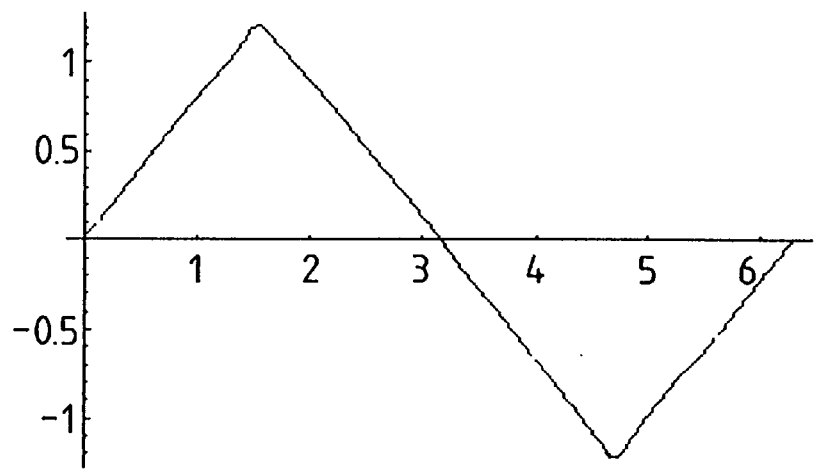
FIG. 3(a) is a graph for describing a spatial distribution of an envelopes of acoustic pressure corresponding to the triangular wave of FIG. 2(a), which is created by superimposing 10 sine waves on one another
Figure 3B:
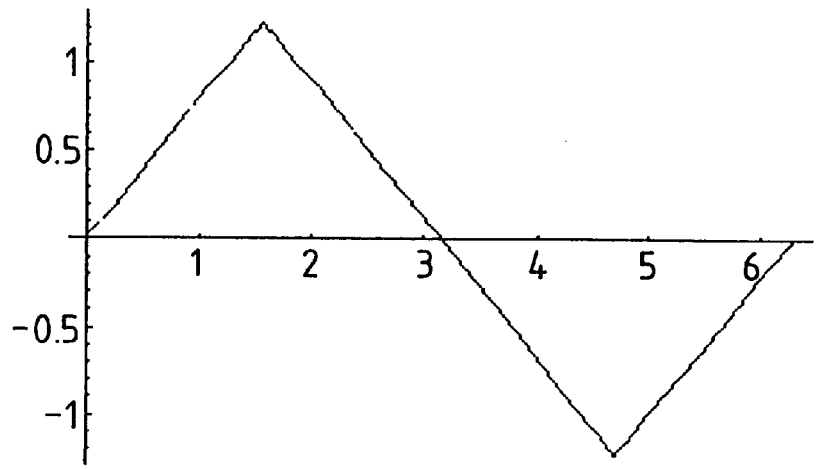
FIG. 3(b) is a graph for describing a spatial distribution of an envelopes of acoustic pressure created by superimposing 100 sine waves on one another.

It is desirable that when the standing wave is produced in the chamber 5, the basic wave number vector k becomes equal to $k=(2\pi/L) \times (m+\frac{1}{2})$ with respect to a width L of an in-chamber wall. Here, m in the same equation indicates an integer. In the equation 4, the sine waves having the angular frequencies ranging from $\omega$ to $n\omega$ are superimposed on one another. Here, n indicates the value of an integer and may be ideally $\infty$. However, n may be a finite value in an actual apparatus configuration. When, for example, n=10, a superimposed waveform shown in FIG. 3(a) is created in practice. On the other hand, when n=100, a superimposed waveform shown in FIG. 3(b) is formed. In either case, the triangular wave shown in FIG. 2(a) can be approximately created.

In order to generate the pressure vibration expressed in the equation 4 from each of the ultrasound sources 6 and 7, a voltage vibration V given by the following equation may be applied to a piezoelectric actuator when each ultrasound source is of the piezoelectric actuator, for example, $$V = V_0 + V_1 \cdot \sum_{i=1}^{n} \frac{(-1)^{i+1}}{(2i-1)^2} \cdot B((2i-1)\omega) \cdot \sin\{(2i-1)(\omega t) + \alpha\} \quad (5)$$

where $V_0$ indicates an offset voltage, $V_1$ indicates a peak voltage, $\omega$ indicates a basic angular frequency of an ultrasound beam, B$\omega$') indicates a term for correcting ununiformity of the efficiency of conversion of a peak voltage at a different angular frequency $\omega$' to a vibration amplitude of the piezoelectric actuator, and $\alpha$ indicates an offset for correcting the phases of vibrations of respective vibrators at the time that a plurality of ultrasound sources are used. n indicates an integer and may preferably be $\infty$ in the same manner as described above even in this case. However, n may be a finite value in practice.

Thus, the control device 10 for driving the piezoelectric actuator has an amplification or transfer characteristic varied according to a frequency variation, which is given by the following equation to correct the ununiformity of the above conversion efficiency, and can determine the waveform of an input voltage without taking into consideration the ununiformity of the conversion efficiency, $$B(\omega')=\omega'/\omega \quad (5.2)$$

where $\omega$' indicates an angular frequency of an input ultrasound beam.

Figure 4A:
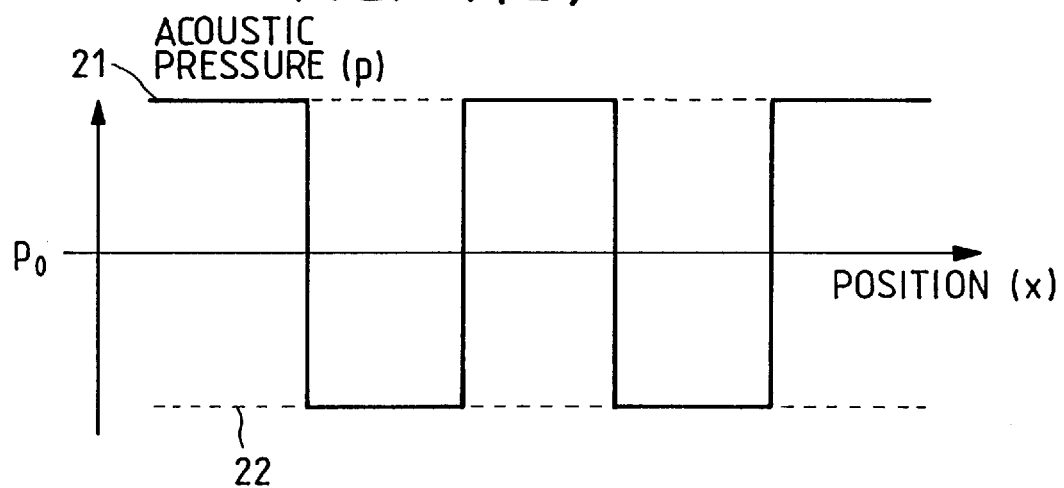
FIG. 4(a) is a graph for describing a spatial distribution of an envelopes of acoustic pressure at the time that a standing wave represented in the form of a rectangular wave is produced in a tube and FIG. 4(b) is a graph for describing a potential energy distribution in the chamber at the time of its production.
Figure 4B:
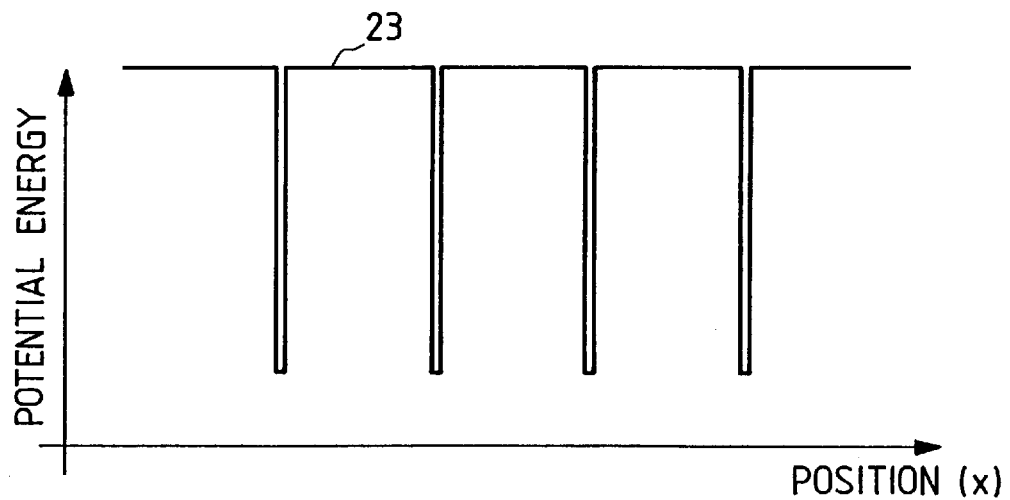

When each sufficiently concentrated particle is handled, a standing wave indicated by envelopes 21 and 22, which is represented as a rectangular wave in FIG. 4(a), is produced in the chamber 5, thereby making it possible to create a potential energy distribution 23 in the chamber 5 as shown in FIG. 4(b). When each particle is concentrated under an acoustic radiation force, a density distribution of the concentrated particles at the time that it has reached a stationary condition, is determined according to the balance between an acoustic radiation force subjected to each particle and a diffusion force. Thus, in the potential energy distribution shown in FIG. 4(b), the acoustic radiation force subjected to each particle becomes a maximum at the position of the node of the standing wave and the efficiency of concentration of each particle is maximized. In order to produce such a potential field of rectangular wave type with each ultrasound beam, the intensities of a plurality of ultrasound beams of frequencies are adjusted according to their frequencies as given by the following equation and an ultrasound beam obtained by superimposing these on one another may be introduced into the chamber 5 from each of the ultrasound sources 6 and 7, $$p = p_0 + p_1 \cdot \sum_{i=1}^{n} \frac{\{1-(-1)^i\}}{i} \cdot \sin\{i(k \cdot x - \omega t) + \delta\} \quad (6)$$

where p indicates an envelope of acoustic pressure at a position x, $p_o$ indicates hydrostatic pressure in the chamber, $p_1$ indicates peak pressure of the ultrasound beam, k indicates a basic wave number vector of the ultrasound beam, $\omega$ indicates a basic angular frequency of the ultrasound beam, and $\delta$ indicates a phase offset between a plurality of ultrasound beams produced from a plurality of ultrasound sources. It is desirable that when the standing wave is produced in the chamber 5, the basic wave number vector k becomes equal to $k=(2\pi/L) \times (m+\frac{1}{2})$ with respect to a width L of an in-chamber wall. Here, m in the same equation indicates an integer.

Figure 5A:
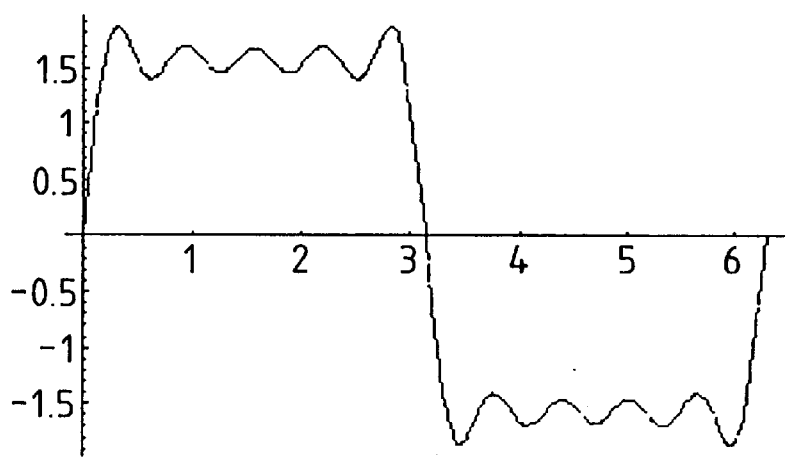
FIG. 5(a) is a graph for describing a spatial distribution of an envelopes of acoustic pressure corresponding to the rectangular wave of FIG. 4(a), which is created by superimposing 10 sine waves on one another
Figure 5B:
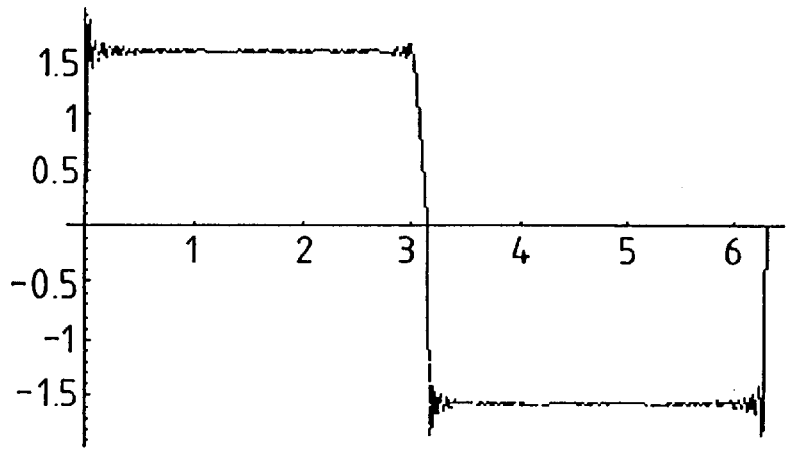
FIG. 5(b) is a graph for describing a spatial distribution of an envelopes of acoustic pressure created by superimposing 100 sine waves on one another.

In the equation 6, the sine waves having the angular frequencies ranging from $\omega$ to $n\omega$ are superimposed on one another. Here, n indicates the value of an integer and may be ideally $\infty$. However, n may be a finite value in an actual apparatus configuration. When, for example, n=10, a superimposed waveform shown in FIG. 5(a) is created in practice. On the other hand, when n=100, a superimposed waveform shown in FIG. 5(b) is formed. Thus, the rectangular wave shown in FIG. 4(a) can be approximately created. It is understood that in the vicinity of the position of a node of the standing wave in particular, the resultant waveform can have a gradient indicative of a variation in acoustic intensity, which is sufficiently large as compared with the triangular wave.

Thus, the intended spatial distribution of potential energy can be created by superimposing a plurality of ultrasound beams different in intensity, phase and wavelength from each other on one another in the same manner as described above. In the equations 4 through 6, a Fourier synthesis is performed by superimposing the plurality of sine waves on one another to create the intended spatial distribution of potential energy. However, if it is possible to realize the intended potential shape, then any ones may be actually utilized as the shape of the ultrasound beam inputted from each ultrasound source to the chamber 5.

Further, the shape of each ultrasound beam produced in the chamber 5 is continuously changed to enhance the effect of concentrating each particle and the potential shape may be gradually varied according to the degree of its concentration.

Figure 2B:
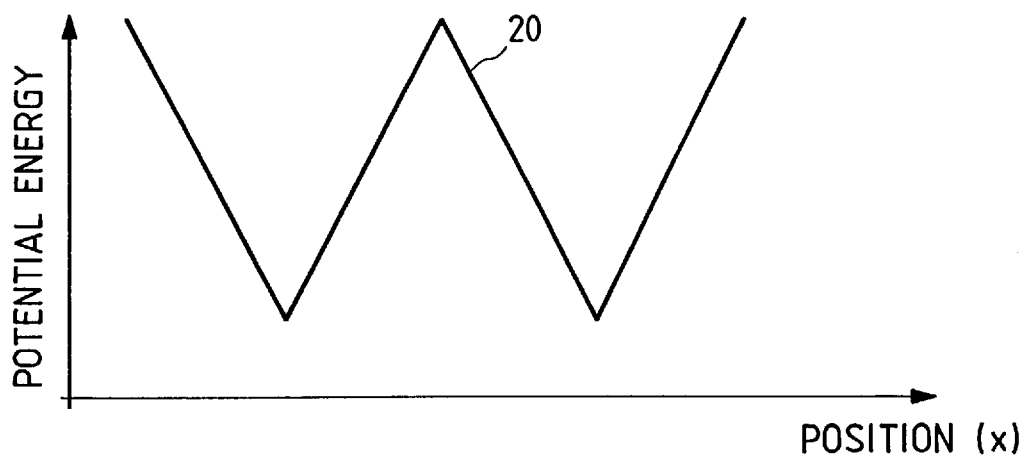
FIG. 2(b) is a graph for describing a potential energy distribution in the chamber at the time of its production.

Each particle may be also effectively concentrated in the following manner. Namely, for example, a triangular position potential energy distribution such as shown in FIG. 2(b) is created at the initial concentration stage and a potential energy distribution in the vicinity of a position potential minimum point is sharply inclined as the particle is gradually concentrated. Finally, a potential energy distribution is produced so as to maximize such a potential energy distribution as shown in FIG. 4(b), whereby each particle can be effectively concentrated.

As has been described in the "Ultrasonic symposium proceeding", pp.1843–1846 (1994), IEEE by Umemura et al, an ultrasound beam having a basic frequency and an ultrasound beam having a frequency corresponding to twice the basic frequency may be superimposed on one another so as to produce cavitation at their superimposed location after the concentration of each particle or in the course of its concentration process.

Figure 6A:
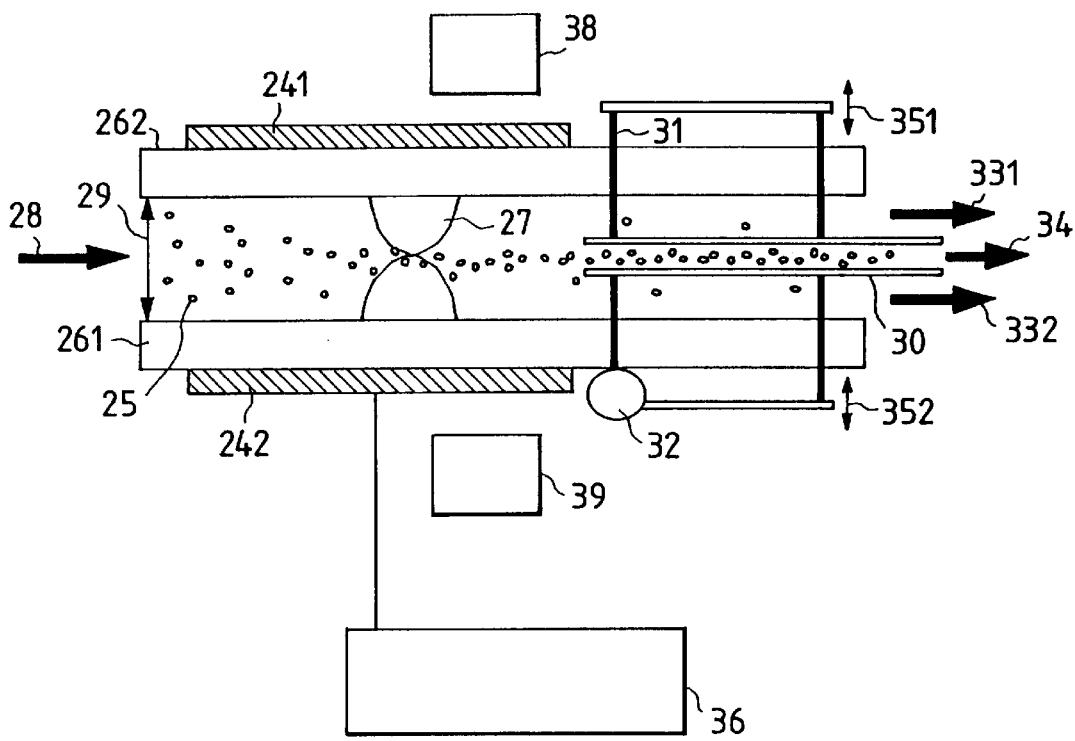
FIG. 6(a) is a view typically showing a transverse cross-section of an ultrasonic chamber and FIG. 6(b) is a typical view of the ultrasonic chamber as viewed diagonally from above.
Figure 6B:
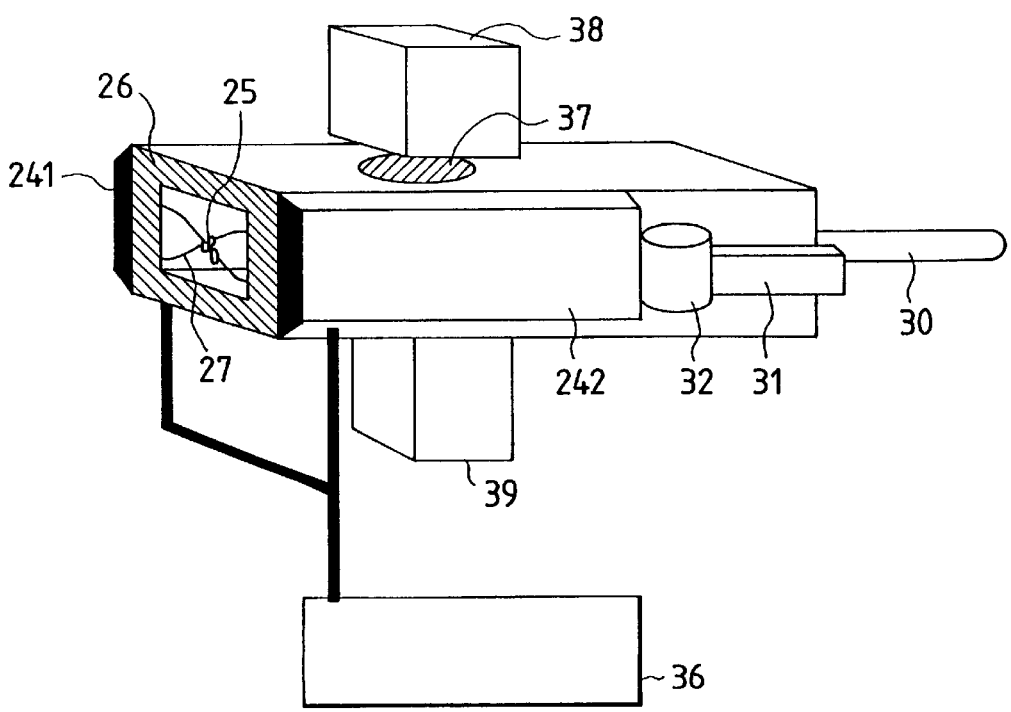

FIG. 6 shows a first embodiment of the present invention applied to a particle continuous concentrating apparatus, wherein FIG. 6(a) is a view typically showing a transverse cross-section of an ultrasonic chamber and FIG. 6(b) is a typical view of the ultrasonic chamber as viewed diagonally from above.

The present embodiment first comprises two side walls 261 and 262 of a chamber 26 for passing a fluid containing particles therethrough and ultrasound sources 241 and 242 respectively applied onto the side walls 261 and 262 and activated so as to generate a standing wave 27 in the chamber 26. Solutes such as particles 25 or the like in a solution can be gathered by each ultrasound beam. When the fluid is water, a wavelength $\lambda$ in water becomes 1.5 mm when the frequency of an ultrasound beam generated from each of the ultrasound sources 241 and 242 is 1 MHz. If a width 29 of the chamber is of $\lambda/2$ or $(\lambda/2+n\lambda)$, then such a standing wave 27 as expressed in the equation 1 is produced in the chamber 26. Here, n indicates an integer and $\lambda$ indicates wavelength of ultrasound. The particles 25 lying in the standing wave 27 are divided into such particles as expressed in the equation 3, particles focused on the node of the standing wave depending on the relationship between the speed of sound in water and the density of water, and particles gathered at an anti-node thereof. It is therefore possible to concentrate the particles at the node position of the standing wave and the anti-node position thereof. In the concentrating apparatus according to the present embodiment, the fluid in the chamber 26 may be rendered stationary and dynamic when it is desired to concentrate each particle in the chamber 26.

The recovery of each concentrated particle will next be described. After each particle has been concentrated in the fluid, a thin or elongated tube 30 fixed to movable fixing bars 31 within the chamber 26 and having a diameter sufficient thinner than the wavelength of the ultrasound beam, is displaced in the directions indicated by arrows 351 and 352 by an elongated-tube drive unit 32 having the function of monitoring the displacement of the elongated tube 30 within the chamber 26 so as to move to a suitable position within the chamber 26, whereby the fluid at that position is sucked. As a result, the fluid containing the particles focused on the node of the standing wave and the particles gathered at the anti-node thereof can be selectively sucked, or the fluid exclusive of the particles can be selectively sucked. In the present embodiment, the number of the particles concentrated at the position of the node or anti-node of the standing wave in the chamber 26 can be measured by observing scattered light or fluorescence produced by particles from a light source 39 with an observing device 38 through an observation window 37. Since the particles are oriented during the presence of the one-dimensional standing wave as described in the present embodiment so that the longitudinal direction of the particles extends along the node of the standing wave, the shape of each particle can be also determined.

When, at this time, the diameter of the elongated tube 30 is set sufficiently thin as compared with the wavelength of the ultrasound beam or a process for preventing the ultrasound beam from reflection is effected on the external surface of the elongated tube 30, the elongated tube 30 can be introduced into a sound field without disturbing the sound field.

Further, an electrostatic force can be produced in a channel 29 by inserting two plate electrodes into the chamber 26 along the ultrasound sources 241 and 242 and making the difference in voltage between the two electrodes. At this time, the particles 25 in the chamber 26 are respectively concentrated at positions where electrostatic forces produced due to surface charges held by the particles 25 and an acoustic radiation force are brought into balance.

Further, in the present embodiment, a concentration/separation process free from mixing of impurities from the outside can be realized by transporting a solvent fed from the previous process using a closing tube and introducing a process of sterilizing all the solutions introduce from the outside or a process of filtrating them. Based on distributions of the particles in the fluid, which has been obtained by the observing means, the control device 36 may adjust the intensities, phases and frequencies of the ultrasound beams produced from the ultrasound sources or the degree of superimposition of these ultrasound beams, or the velocity of flow of the solution, or the position and velocity of sucking of the fluid to be extracted by the elongated tube, or the intensity of another external force such as the electric force or the like referred to above.

Moreover, in the present embodiment, the temperature of the solution flowing in the chamber 26 can be also controlled by controlling the temperature of the chamber 26. The chamber rectangular in section has been used in the present embodiment. However, a plurality of ultrasound sources disposed on chamber wall according to the shape of the chamber are used to apply ultrasound beams in which a plurality of frequencies and phases have been suitably superimposed on one another respectively, whereby a desired spatial distribution of potential energy can be created in the chamber.

FIG. 7 shows a second embodiment of the present invention applied to an apparatus for concentrating particles and periodically arranging them at periodic positions, wherein FIG. 7(a) is a view showing a spatial distribution of potential energy caused to act on particles within an ultrasonic chamber, FIG. 7(b) is a view illustrating the manner in which particles are focused on minimum points of potential energy created by an acoustic radiation force within the ultrasonic chamber, and FIG. 7(c) is a view typically showing the state of arrangement of particles on a substrate as viewed diagonally from above.

For example, a rectangular ultrasound beam is produced in a solution 43 containing particles 46 charged in a solution tank 42 shown in FIG. 7(b) so as to move in the directions indicated by arrows 441 and 442 from ultrasound sources 411 and 412 controlled by an ultrasound source drive unit 47. Further, a spatial distribution of potential energy 40 shown in FIG. 7(a), which has been produced as described previously in FIG. 4, is formed on a substrate 45, whereby the particles 46 can be arranged at potential minimal points formed on the substrate 45. The particles 46 arranged on the substrate 45 shown in FIG. 7(c) may be conductors or optically-opaque substances, or insulating materials and specific gravity of the particles may be heavier than the fluid. The ultrasound source drive unit 47 may cause each ultrasound source to generate a rectangular wave. Otherwise, if a potential energy distribution in which potential minimal points exist, can be realized at the intended position, then any ultrasound beams may be produced from the ultrasound sources 411 and 412. Alternatively, the ultrasound beams may be produced from the vibrators so as to be superimposed on one another.

In the present embodiment, the potential distribution in the one-dimensional direction is created and the particles are one-dimensionally arranged. However, a three-dimensional potential distribution can be created by utilizing a plurality of ultrasonic vibrating sources and superimposing ultrasound beams produced from these sources of ultrasound on one another in the same manner as described above.

Figure 8:
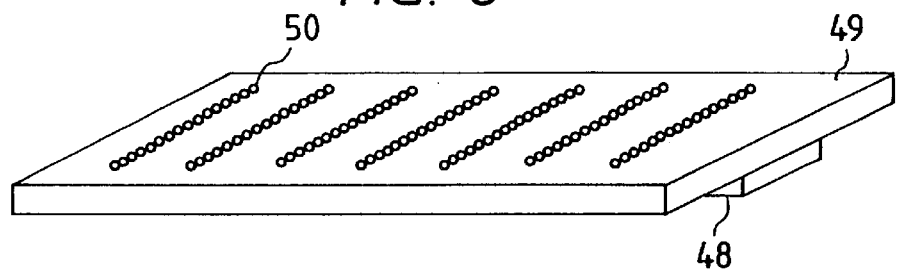
FIG. 8 is a conceptual view showing an apparatus configuration as viewed diagonally from above at the time that the present invention is applied to another embodiment of an apparatus for periodically arranging particles.

FIG. 8 is a conceptual view showing an apparatus configuration as viewed diagonally from above at the time that the present invention is applied to another embodiment of an apparatus for periodically arranging particles.

A SAW or Lamb wave is created on the surface of a substrate 49 by an ultrasound source 48 provided below the substrate 49. Thus, particles 50 can be arranged by allowing the intensity of an ultrasound beam that leaks from above the substrate 49 to hold a distribution.

Figure 9:
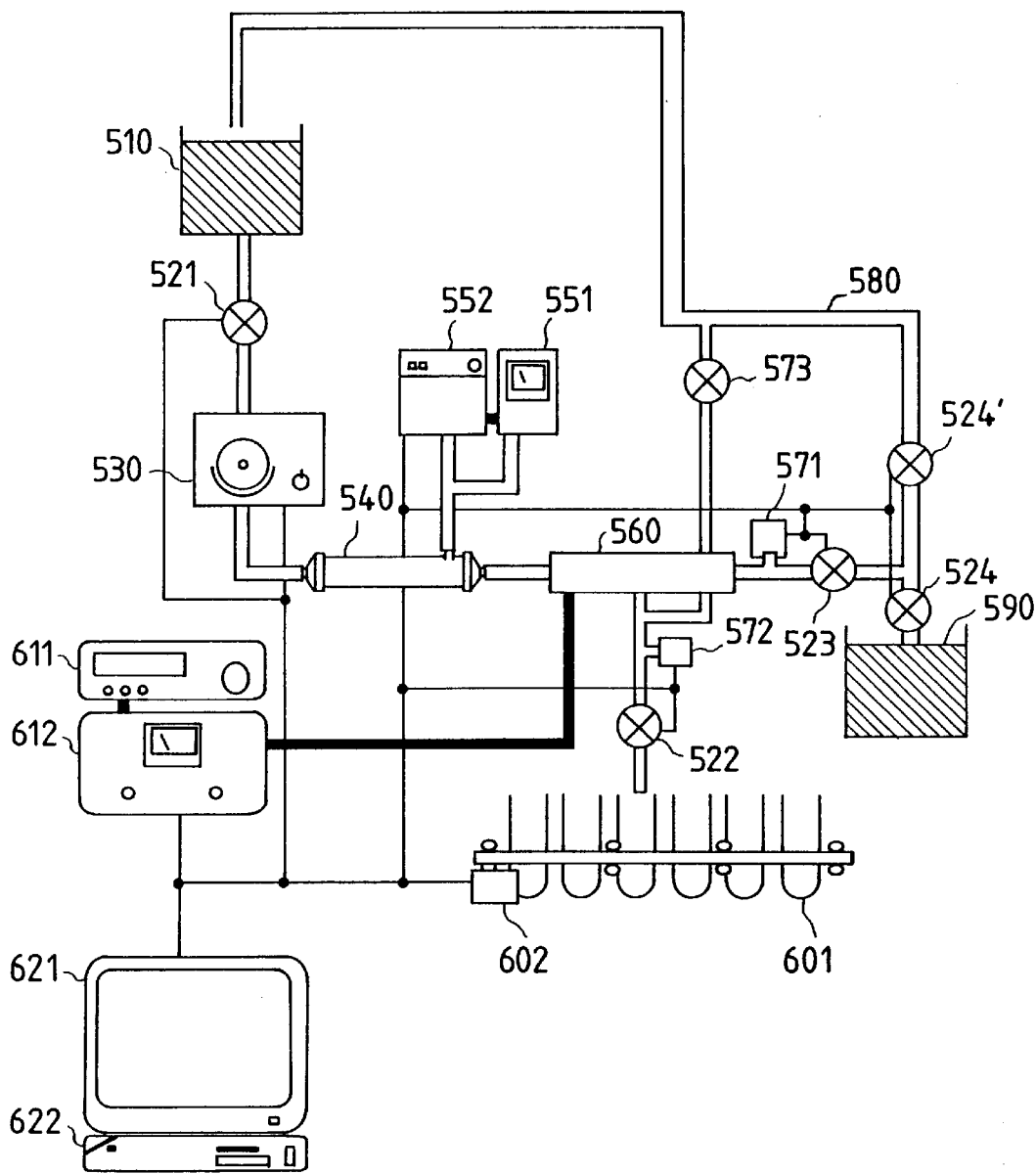
FIG. 9 is a typical view illustrating the configuration of another embodiment of a particle continuous separating apparatus according to the present invention.

FIG. 9 is a typical view illustrating the configuration of another embodiment of a particle continuous concentrating apparatus according to the present invention.

The particle continuous concentrating apparatus according to the present embodiment is essentially identical to the particle continuous concentrating apparatus shown in FIG. 1. However, as compared with the embodiment shown in FIG. 1, a suction tube provided to take out a concentrated solvent or concentrated particles is devised not so as to disturb a sound field of each ultrasound beam. Further, a means for removing dissolved air in a sample prior to the introduction of the sample into an ultrasonic chamber is additionally provided. Alternatively, a devise for additionally providing a route for returning a concentrated sample to a sample trap or reservoir so that the sample can be repeatedly concentrated, is done. When the blood is used as a sample solution, the present embodiment is effective in separating it into cell components such as red blood cells or erythrocytes, white blood cells or leucocytes, etc. existing in the blood and plasma, for example.

A sample solution introduced into a sample solution tank 510 is conveyed to a degas unit 540 through a valve 521 by a solution feed pump 530. In the degas unit 540, a silicon tube having an inner diameter of 500 $\mu$m and a film thickness of 20 $\mu$m and serving so as to feed the sample solution is disposed within a vacuum chamber. Further, a dissolved gas in the sample solution is discharged through the film of the silicon tube. Since the degree of degassing of the sample solution can be adjusted according to the flow velocity of the solution and the degree of vacuum in a degas chamber, the degree of vacuum in the degas chamber is varied by a vacuum pump 552 according to a variation in the flow velocity of the solution in the solution feed pump 530 while the degree of vacuum in the vacuum chamber of the degas unit 540 is being measured by a vacuum gage 551, whereby the sample solution is adjusted to its desired degree of degassing. The dissolved gas in the sample solution can be reduced so that the maximum ultrasonic irradiation intensity free from the generation of cavitation is enhanced by the ultrasound beam irradiated in an ultrasonic chamber 560 provided on the downstream side. As a result, the intensity of an acoustic radiation force exerted on each particle in the sample solution can be enhanced. Of course, the degree of degassing of the sample solution and the intensity of the ultrasound beam in the ultrasonic flowcell 560 are adjusted so as to fall within a range in which they do not exert an influence on the components in the sample solution. When the sample solution is of the red blood cells, components in the red blood cells are not eluted even if the amount of the dissolved air is reduced to about 30% of the saturation. Further, when the ultrasound beam is applied in an ultrasonic intensity free of the generation of cavitation, the red blood cells receive no damage.

The degassed sample solution is introduced into the ultrasonic chamber 560. At least one ultrasound source in the ultrasonic chamber is driven based on a voltage vibration waveform obtained by amplifying a voltage vibration waveform produced by a function generator 611 with an amplifier 612. The sample solution introduced into the ultrasonic chamber 560 is separated into a solution in which particle components are concentrated in the ultrasonic chamber 560 and a particle-free solvent. The amount of outflow of the particle-free solution is adjusted by controlling the degree of opening of a valve 522 according to information about a pressure of a solution, which has been measured by a pressure sensor 571 and information about the pressure of a solution, which has been measured by a pressure sensor 572. The extracted solvent component is stored in one of sample solution holders 601. This sample solution holder 601 can be replaced with another by a drive device 602. This sample solution holder 601 is switched to another when the sample solution tank 510 is replaced by another.

The amount of outflow of the solution in which the particle components have been concentrated, is adjusted by controlling the degree of opening of a valve 523 according to information about the solution pressure measured by the pressure sensor 571 and either of channels is selected by valves 524 and 524' provided on the downstream side of the valve 523. Thus, the solution is discharged into a solution reservoir 590, or the channel 580 is selected so as to return the solution to the sample solution tank 510 again, where the particle components in the solution can be further concentrated. When it is desired to increase the density of the solvent component, the valve 522 is closed and a valve 573 is opened to return it to the sample solution tank 510, where the same operation as described above may be repeated. Here, the concentrated particle components may be held in a holder similar to the previously-mentioned sample holder 601 in place of the solution reservoir 590 in association with the sample.

When the difference between the solution pressure detected by the pressure sensor 571 and that detected by the pressure sensor 572 is sufficiently small, the ratio of the quantity of flow of the solution in which the particle components extracted from the ultrasonic chamber 560 have been concentrated to the quantity of flow of the particle-free solvent coincides with the ratio between sectional areas of suction tubes connected to the ultrasonic chamber 560. The particles in the solvent component decrease in number by adjusting the degrees of openings of the valves 522 and 523 so that the pressure detected by the pressure sensor 572 becomes greater than that detected by the pressure sensor 571. Further, the particles in the solvent component increases in number by adjusting the degrees of openings of the valves 522 and 523 so that the pressure detected by the pressure sensor 572 becomes lower than that detected by the pressure sensor 571. The maximum ultrasonic irradiation intensity free of the generation of cavitation can be enhanced by setting the sample-solution pressures detected by the pressure sensors 571 and 572 so as to be higher than the atmospheric pressure under the adjustment of the degrees of openings of the valves 522 and 523.

Specific descriptions on the opening and closing of each valve, the driving of each ultrasound source, the adjustment of the degassing degree of vacuum, etc. which have been performed in the present apparatus, will be omitted. However, they are all executed by a control computer 622. The results of execution by the control computer 622 are displayed on a monitor 621. A thick line for providing a connection between an amplifier 612 and the chamber 560 indicates a drive system for each ultrasound source. Thin lines for providing connections between the monitor 621 and the respective components such as the pump 530 or the valves 522 and 523, etc. indicate respective control systems.

Figure 10:
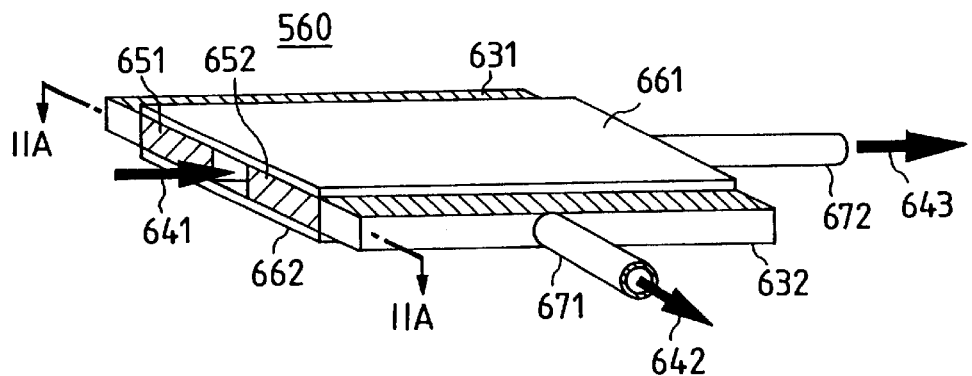
FIG. 10 is a typical view as seen diagonally from above, showing a structure of an ultrasonic chamber employed in the embodiment shown in FIG. 9.
Figure 11:
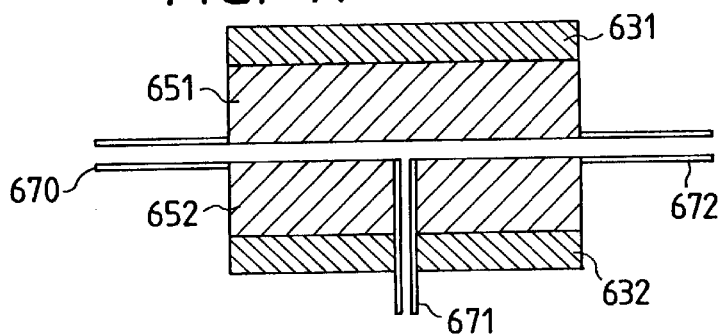
FIG. 11 is a cross-sectional view as seen in the direction indicated by arrows at a position taken along line 11A—11A of the chamber in FIG. 10, illustrating the structure of the ultrasonic chamber shown in FIG. 10.

FIG. 10 is a typical view as seen diagonally from above, showing a structure of an ultrasonic chamber employed in the embodiment shown in FIG. 9. FIG. 11 is a cross-sectional view as seen in the direction indicated by arrows at a position taken along line 11A—11A of the cell in FIG. 10, illustrating the structure of the ultrasonic chamber shown in FIG. 10.

In the ultrasonic chamber 560, two resonance plates 651 and 652 are disposed in an opposing relationship and shielding plates 661 and 662 are provided on both surface of the ultrasonic chamber 560 to thereby form a sample solution channel. Ultrasound sources 631 and 632 are respectively provided outside the resonance plates 651 and 652. If the width of the channel is supposed to be $\lambda/2$ or $(\lambda/2+n\lambda)$ of a wavelength of an ultrasound beam produced by each ultrasound source, then a standing wave in which the node of acoustic pressure of the ultrasonic standing wave exists in the center of the channel, is produced. Here, n indicates an integer. A tube 670 (not shown in FIG. 10) for introducing a sample solution, a tube 671 for discharging a solvent component and a tube 672 for discharging a solution in which each particle has been concentrated, are respectively provided within the channel. As is apparent by reference to FIG. 11, a suction port of the draft tube 671 is simply defined in one surface of the resonance plate 652. The diameter of this tube is sufficiently smaller than the wavelength of the ultrasound beam ($\lambda$). Accordingly, the channel is substantially similar to having no aperture in regard to the irradiation of the ultrasound beam and hence the sound field is not disturbed by the draft tube 671.

The ultrasonic chamber 560 extracts the solvent component in the direction indicated by arrow 642 through the tube 671 from the sample solution introduced in the direction indicated by arrow 641 through the tube 670, and takes out the solution with the concentrated particles in the direction indicated by arrow 643 through the tube 672 from the sample solution. The ultrasound sources 631 and 632 in the ultrasonic chamber 560 are disposed so that the node of the acoustic pressure of the standing wave appears in the center of the channel along the flow of the sample solution in the channel. The ultrasound sources 631 and 632 can focus particles such as red blood cells, etc. in the sample solution on the node of the acoustic pressure of the standing wave under the action of a acoustic radiation force.

Figure 12:
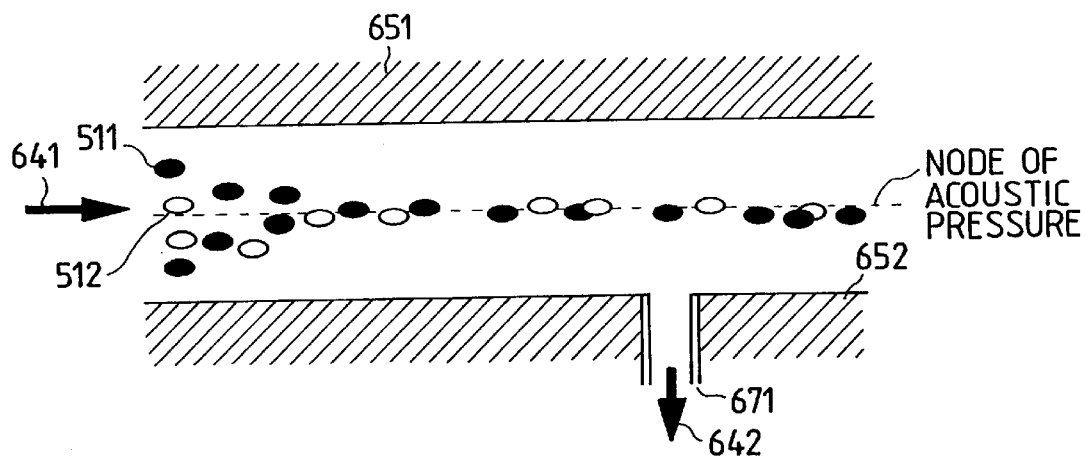
FIG. 12 is a typical view in section as seen in the direction indicated by arrows in FIG. 10, illustrating a process of concentrating and separating particles by the ultrasonic chamber of the particle continuous concentrating apparatus shown in FIG. 9.
Figure 13:
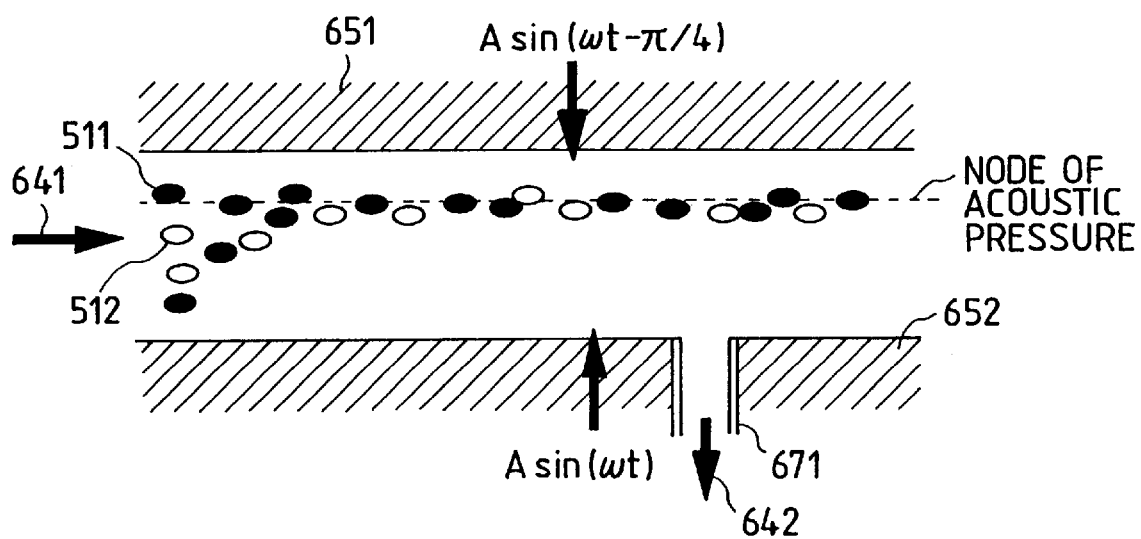
FIG. 13 is a typical view for describing the particle concentrating and separating process of FIG. 12 by an example in which the position of a node of acoustic pressure has been shifted to a position different from that shown in FIG. 12.

FIG. 12 is a typical view in section as seen in the direction indicated by arrows in FIG. 10 of the chamber, illustrating a process of concentrating and separating particles by the particle continuous concentrating apparatus shown in FIG. 9. FIG. 12 shows the manner in which the particles such as the red blood cells, etc. in the sample solution can be collected at the node of the acoustic pressure of the standing wave by the acoustic radiation force.

Particles 511 and 512 introduced into the channel created by the two resonance plates 651 and 652 undergo a force produced by an ultrasound beam during a process in which they flow downstream along the channel. Thus, when the particles 511 and 512 start to gather at the node of the acoustic pressure of the standing wave, which occurs in the center of the channel, and they flow downstream to the position of provision of the draft tube 671, the particles are brought into a state of being separated into a particle layer and a solvent layer.

If the frequency of an ultrasound beam produced from each of the ultrasound sources 631 and 632 is of 1 MHz when the solvent is water, then a wavelength $\lambda$ of the ultrasound beam in the water becomes 1.5 mm. If the width of the channel is of $\lambda/2$ or $(\lambda A/2+n\lambda)$, then a standing wave is produced in which the node of acoustic pressure exist in the center of the channel. Further, the ultrasound beam can be more effectively introduced into the channel by respectively placing the resonance plates 651 and 652 each having such a thickness as to become $\lambda/2$ or $(\lambda/2+n\lambda)$ of the wavelength of an ultrasound beam to be used, between the ultrasound sources and the channel.

Further, when the resonance plates 651 and 652 are respectively composed of a conductor such as gold, platinum, copper, stainless or the like or of an insulating material such as glass or other material or the like, they can be formed into ones formed by applying the conductors on their surfaces brought into contact with the solution by vacuum evaporation. At this time, an electric field can be generated in the solution by making the difference in potential between conductive portions of the two resonance plates 651 and 652. As will be described later, a force produced by the generated electric field, other than the force based on the ultrasound beam can be also applied to each particle in the solution to separate the particles 511 and 512 different in charge from each other and recover them. The potential difference applied to generate the electric field is defined so as to fall within a range from 0 V to 1.23 V with a hydrogen electrode as a reference potential in order to prevent elution of an electrode component due to oxidation and reduction of a sample solution at an electrode surface or an electrode or prevent the occurrence of bubbles due to the electrolysis of a solution component. This value is given from an electrochemical potential required to oxidize or reduce a hydrogen ion and an oxygen ion to gas molecules. When a substance higher than the hydrogen ion in reduction potential or a substance lower than the oxygen ion in oxidation potential exists in the sample solution or the electrode, a potential corresponding to the difference between the highest reduction potential and the lowest oxidation potential is used.

When each of the resonance plates 651 and 652 is composed of ferromagnetic dielectrics such as $CoCO_3$, a ferrite or the like, a force produced by an ultrasound beam and a force produced by a magnetic field can be applied to each particle in a fluid, thereby enabling separation between one such as a magnetic bead responsive to magnetism in particles and other particles.

In the present embodiment, since the particle components such as the red blood cells, etc. are focused on the channel center corresponding to the node of the acoustic pressure, the solvent component can be taken out without disturbing the sound field formed in the channel by discharging the solvent component through the hole defined in the wall surface for launching the ultrasound beam and capable of sucking the solvent component such as the plasma or the like. It is desirable in this case that the size of the sucking hole is sufficiently smaller than the wavelength of an ultrasound beam to be used. Further, the number or type of concentrated particle components, the absorption property of each solvent component, and the like can be optically measured by forming the remaining two wall surfaces 661 and 662 of a light-transmissive material such as glass or the like.

Further, the present embodiment shows the configuration in which the section of the channel is rectangular. However, in the same manner as described above even when a chamber circular in channel section is used, the flow of concentrated particles can be formed in the center of the chamber by launching such an ultrasound beam that the inner diameter of the chamber becomes $\lambda/2$ or $(\lambda/2+n\lambda)$ of the wavelength of the ultrasound beam, into the chamber. It is therefore possible to suck only solvent components through a suction hole defined in a part of a chamber wall. In this case, the efficiency of irradiation of the ultrasound beam can be increased by respectively disposing resonators so as to cover about half of the chamber.

When the particles are placed in the center of the channel in the present embodiment, the two ultrasound sources 631 and 632 may be driven so as to generate an ultrasound beam expressed in the following equation (7):

$$A\sin(\omega t) \tag{7}$$

where A indicates the maximum amplitude of a pressure vibration relative to hydrostatic pressure, x indicates an angular frequency of the ultrasound beam, and t indicates the time. When the width of the channel is of $(\lambda/2)$ with respect to the wavelength of the ultrasound beam, a sound field created in the channel by the ultrasound beam applied from each of the two ultrasound sources 631 and 632 is given by the following equation (8):

$$A\sin(\omega t-kx)+A\sin\{\omega t+k(x-\lambda/2)\} \tag{8}$$

When the equation (8) is changed as given by the following equation (9) starting from the equation (8), the resultant product is as follows:

$$\left.\begin{array}{l} A\sin(\omega t-kx)+A\sin\{\omega t+k(x-\lambda/2)\} \\ =A\sin(\omega t-kx)+A\sin\{(\omega t-k\lambda/8)+k(x-3\lambda/8)\} \\ =A\sin(\omega t-kx)+A\sin\{(\omega t-\pi/4)+k(x-3\lambda/8)\} \end{array}\right\} \tag{9}$$

As a result, the position of the node of the acoustic pressure of the acoustic standing wave can be shifted from the center of the channel by making a shift in phase between the two ultrasound sources 631 and 632. If an ultrasound beam having a phase indicated by the following equation (10) is introduced from the ultrasound source 632 and an ultrasound beam having a phase given by the following equation (11) is introduced from the ultrasound source 631 as is understood by reference to the equation (9) when the width of the channel is set to $(3\lambda/8)$, for example:

$$A\sin(\omega t) \tag{10}$$

$$A\sin(\omega t-\pi/4) \tag{11}$$

the node of the acoustic pressure can be placed in a position of $\lambda/8$ away from the resonance plate 651 and a position of $\lambda/4$ away from the resonance plate 652 and hence the particle components such as the red blood cells, etc. can be concentrated at the position spaced away from the suction hole. In doing so, the mixing of the particle components into a solvent component 642 can be further reduced upon suction of the solvent component 642 from the draft tube 671.

Figure 14:
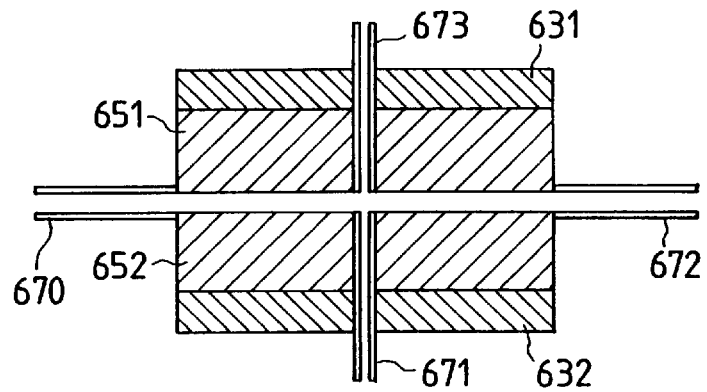
FIG. 14 shows another structure of the ultrasonic chamber employed in the embodiment shown in FIG. 9 and is a cross-sectional view as seen in the same manner as FIG. 12.

FIG. 14 shows another structure of the ultrasonic chamber employed in the embodiment shown in FIG. 9 and is a cross-sectional view as seen in the same manner as FIG. 12. As compared with the embodiment shown in FIG. 11, the present embodiment is characterized in that suction tubes 671 and 673 defined in a wall surface on which an ultrasound beam falls, are disposed symmetrically with respect to the opposed wall surfaces of the ultrasonic chamber.

Figure 15:
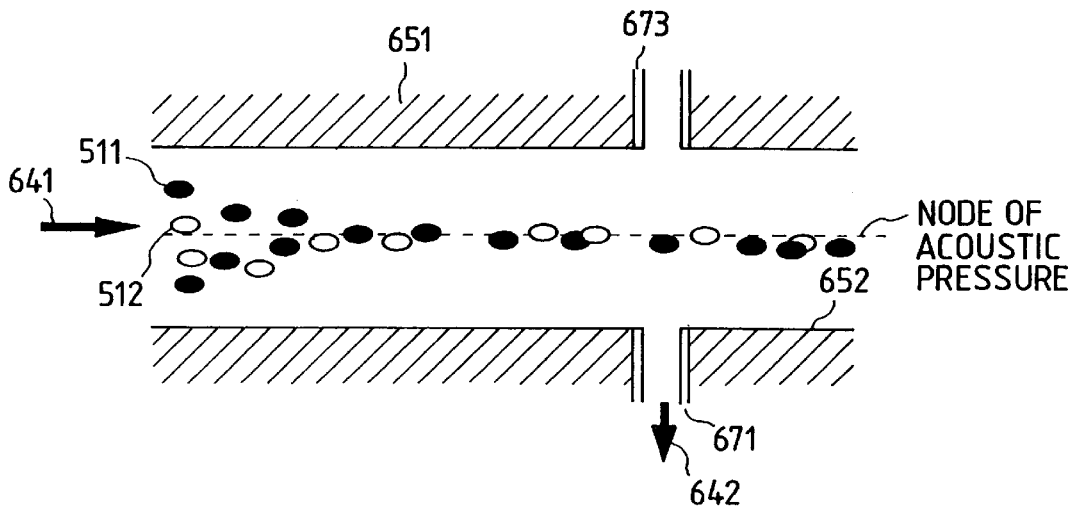
FIG. 15 is a typical view as seen in the same manner as FIG. 12, showing a process of concentrating and separating particles by the ultrasonic chamber of the particle continuous concentrating apparatus shown in FIG. 14.

FIG. 15 is a typical view as seen in the same manner as FIG. 12, showing a process of concentrating and separating particles by the ultrasonic chamber of the particle continuous concentrating apparatus shown in FIG. 14.

Particle components 511 and 512 in a flow 641 of a sample solution are concentrated to a node of acoustic pressure of a standing wave and the solution is sucked at the similar flow velocity from suction tubes 671 and 673 disposed on a chamber wall surface in the direction orthogonal to the flow 641. Thus, solvent components can be extracted without disturbing a sound field created in a channel.

Figure 16:
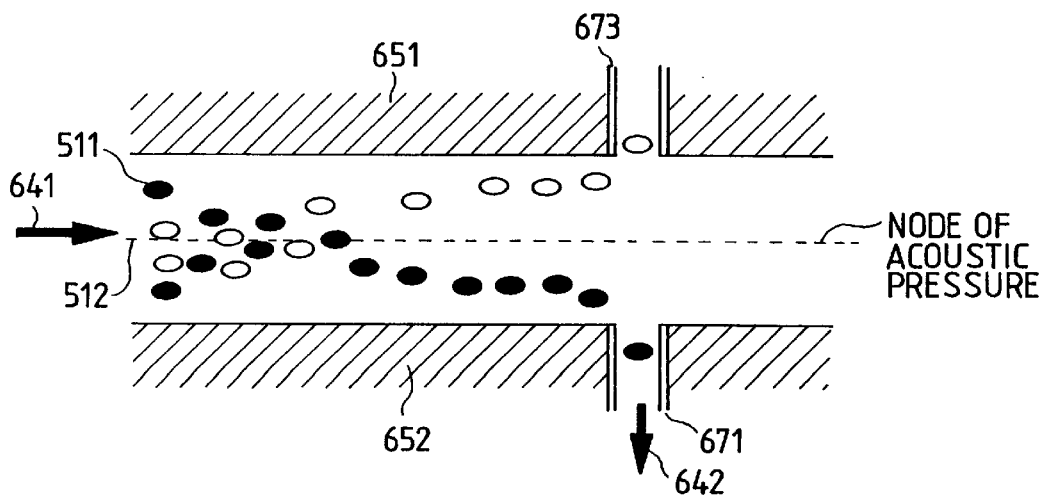
FIG. 16 is a typical view as seen in the same manner as FIG. 12, illustrating a process of concentrating and separating particles by an acoustic radiation force and a force based on an electric field in the ultrasonic chamber of the particle continuous concentrating apparatus shown in FIG. 14.

As described even in the embodiment shown in FIG. 11, the particles 511 and 512 having charges different from each other in the solution can be separated and recovered by making the difference in potential between the resonance plates 651 and 652. FIG. 16 is a typical view as seen in the same manner as FIG. 12, illustrating a separation process of concentrating particles by an acoustic radiation force and a force based on an electric field in a cell.

FIG. 16 shows the manner in which particles 511 each having a positive charge and particles 512 each having a negative charge are separated from each other and recovered when a resonance plate 651 and a resonance plate 652 are respectively used as an anode and a cathode. The particles 511 each having the positive charge are attracted to the resonance plate 652 by an electromagnetic force, so that they are separated into a position where the acoustic radiation force and the electromagnetic force existing between a node of acoustic pressure and the resonance plate 652 are brought into balance. Similarly, the particles 512 each having the negative charge are attracted to the resonance plate 651 by the electromagnetic force, so that they are separated into a position where the acoustic radiation force and the electromagnetic force existing between the node of the acoustic pressure and the resonance plate 651 are brought into balance. Owing to the sucking of the solution from the suction tubes 671 and 673 attached to their corresponding resonance plates, the particles each having the positive charge can be taken out through the suction tube 671 together with the solvent in concentrated form and the particles each having the negative charge can be extracted through the suction tube 673 together with the solvent in concentrated form.

Figure 17:
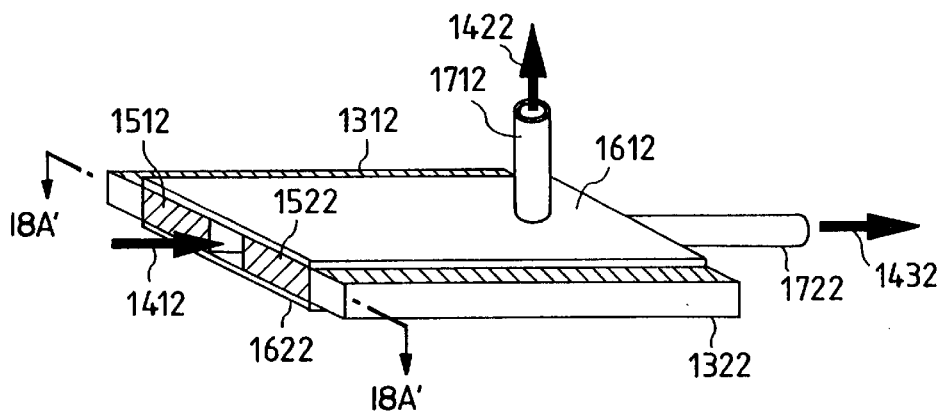
FIG. 17 is a typical view as viewed diagonally from above, showing a further structure of the ultrasonic chamber employed in the embodiment shown in FIG. 9.
Figure 18:
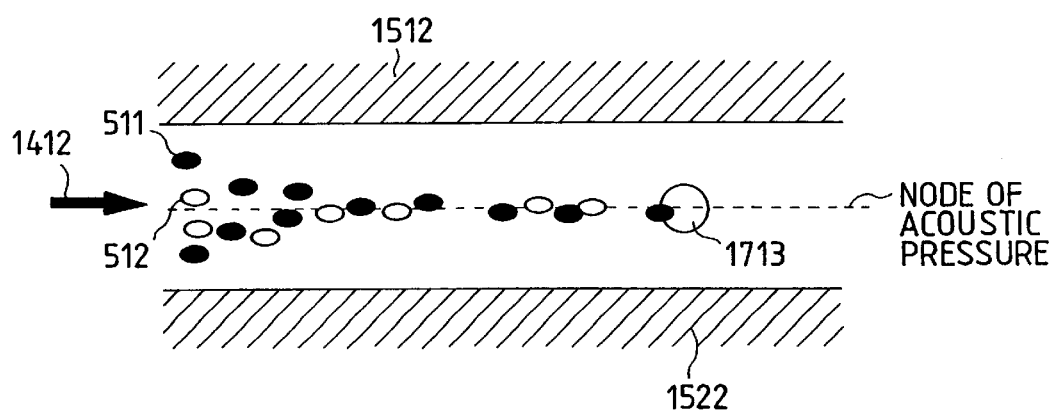
FIG. 18 is a typical view in section as seen in the direction indicated by arrows at a position taken along line 18A'—18A' showing a process of concentrating and separating particles by the ultrasonic chamber of the particle continuous concentrating apparatus shown in FIG. 17.

FIG. 17 is a typical view as viewed diagonally from above, showing a further structure of the ultrasonic chamber employed in the embodiment shown in FIG. 9. FIG. 18 is a typical view in section as seen in the direction indicated by arrows at a position taken along line 18A'—18A' showing a process of concentrating and separating particles by the ultrasonic chamber of the particle continuous concentrating apparatus shown in FIG. 17.

As compared with the embodiments shown in FIGS. 10 and 11, the present embodiment is characterized in that a suction tube 1712 is provided at a position corresponding to a node of acoustic pressure in a channel, which position exists on a wall surface which do not allow an ultrasound beam to enter therein. If the configuration of the present embodiment is used, then particles concentrated at the position of the node of the acoustic pressure can be sucked from a suction hole 1713 disposed at the position of the node of the acoustic pressure as shown even in FIG. 18, together with a solvent without disturbing a sound field.

Figure 19:
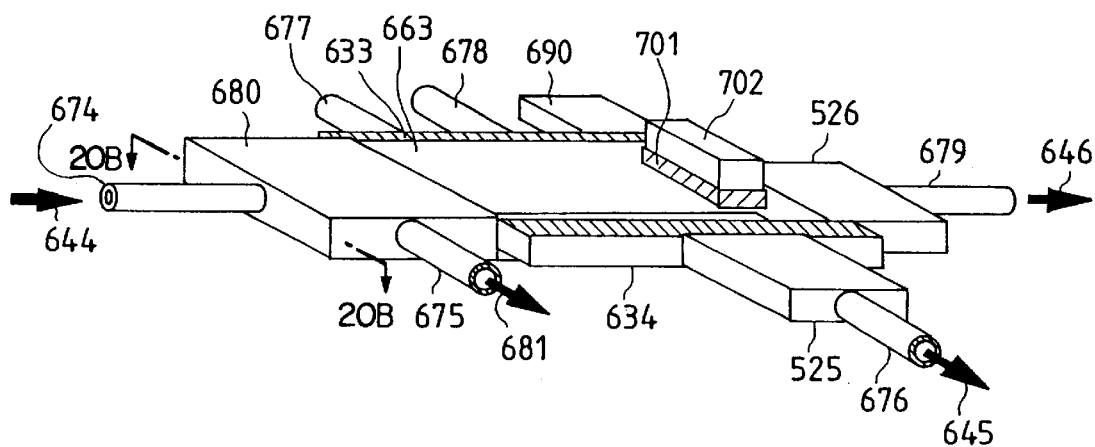
FIG. 19 is a typical view as viewed diagonally from above, showing a still further structure of the ultrasonic chamber employed in the embodiment shown in FIG. 9.
Figure 20:
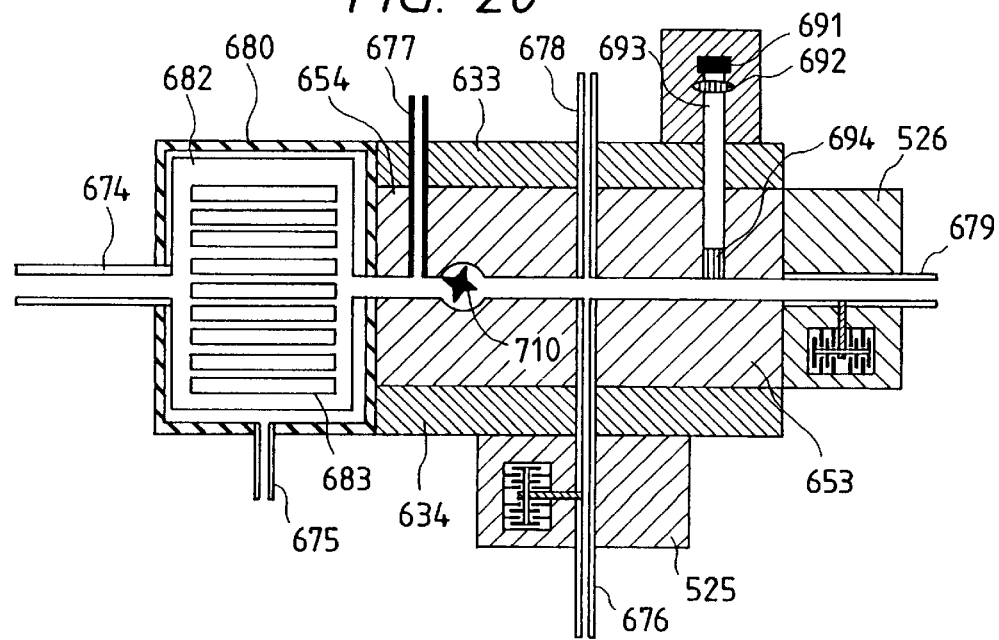
FIG. 20 is a typical view in section as seen in the direction indicated by arrows at a position taken along line 20B—20B illustrating a process of concentrating and separating particles by the ultrasonic chamber of the particle continuous concentrating apparatus shown in FIG. 19.

FIG. 19 is a typical view as seen diagonally from above, showing a still further structure of the ultrasonic chamber employed in the embodiment shown in FIG. 9. FIG. 20 is a typical view in section as seen in the direction indicated by arrows at a position taken along line 20B—20B, illustrating a process of concentrating and separating particles by the ultrasonic chamber of the particle continuous concentrating apparatus shown in FIG. 19.

In the present embodiment, the ultrasonic chamber is structurally formed integrally with a degas unit. Functionally, sample particles are subjected to a dye process so that the number of the particles can be measured.

In the present apparatus, a sample solution is first introduced into a degas unit 680 through an introduction tube 674 in the direction indicated by arrow 644. In the degas unit 680, the sample solution is isolated from a vacuum chamber by silicon thin films 682 and 683. Dissolved air components in the sample solution are degassed through the thin films. The vacuum chamber is connected to a discharge tube 675. The degree of vacuum in a degas chamber is adjusted according to the degree of suction of air from the discharge tube 675.

Next, the degassed solution is introduced into an acoustic or ultrasound concentration unit composed of ultrasound sources 633 and 634 and resonance plates 653 and 654. Both side surfaces of the resonance plates 653 and 654 are covered with shielding plates 663 and 664 (where 664 is not shown in the drawing) in a manner similar to the first embodiment. In the present embodiment, the shielding plate 663 is composed of a translucent material such as glass. The introduced sample solution is mixed with a dye solution such as a fluorescent antibody reagent or the like introduced into a channel of the acoustic concentration unit through a thin tube 677. The sample solution mixed with the dye solution is stirred by a stirrer 710 disposed within the channel and being under rotation by an acoustic radiation force to mix the particles in the sample solution and the dye solution together. In order to dilute the concentration of the dye solution in the solution after the mixing of the particles and the dye solution, a dilute solution is introduced into the downstream of the channel through a tube 678 so that the dye solution ununited with the sample particles in the solution is recovered simultaneously with a solvent component through a tube 676. The position of provision of the tube 676 may be provided downstream from the tube 678. The flow velocity of the solution sucked by the tube 676 is adjusted according to the degree of opening of a valve 525. Similarly, the flow velocity of the solution flowing in the channel is adjusted according to the degree of opening of a valve 526 coupled to a tube 679. Since the particle components in the solution are held at the position of the node of the standing wave during the process of diluting the dye solution, each particle component is not lost and its concentration remains unchanged even if the solvent component is discharged through the tube 676. The sample solution containing the sample particles bonded to the dye is irradiated with light for exciting a fluorescent dye from a light source unit case 690 composed of a LED 691, a lens 692 and a transparent window 694. The number of the particles in the dyed sample solution is detected by a photo diode array 702 disposed on a glass plate 663. At this time, an excited-light cutoff filter 701 may be added to the input side of the photo diode array 702. When a dye solution for varying an absorption property of a sample is used as the dye solution, the number of the dyed particles can be measured by using a filter having an absorption property matched with the used dye solution.

The above-described embodiment shows, as an example, the case in which the dye solution is introduced to optically detect the particles. However, countermeasures against the case where each particle is extremely small and a force produced by an ultrasound beam cannot be sufficiently used, can be taken using the same structure. Namely, a substance that chemically reacts with a particle tail, such as a substance serving as a cross-linking regent, is introduced in place of the dye solution. In doing so, the particles are polymerized by the bridge material so as to become a suitable large one. Thus, the force produced by each ultrasound beam can be sufficiently utilized, whereby the efficiency of a trap can be increased.

Figure 21:
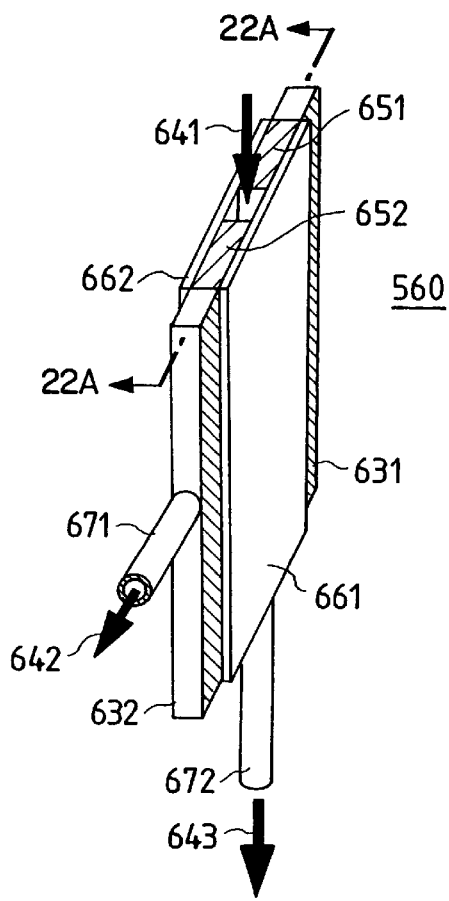
FIG. 21 is a view showing the manner in which an ultrasonic chamber is longitudinally disposed.
Figure 22:
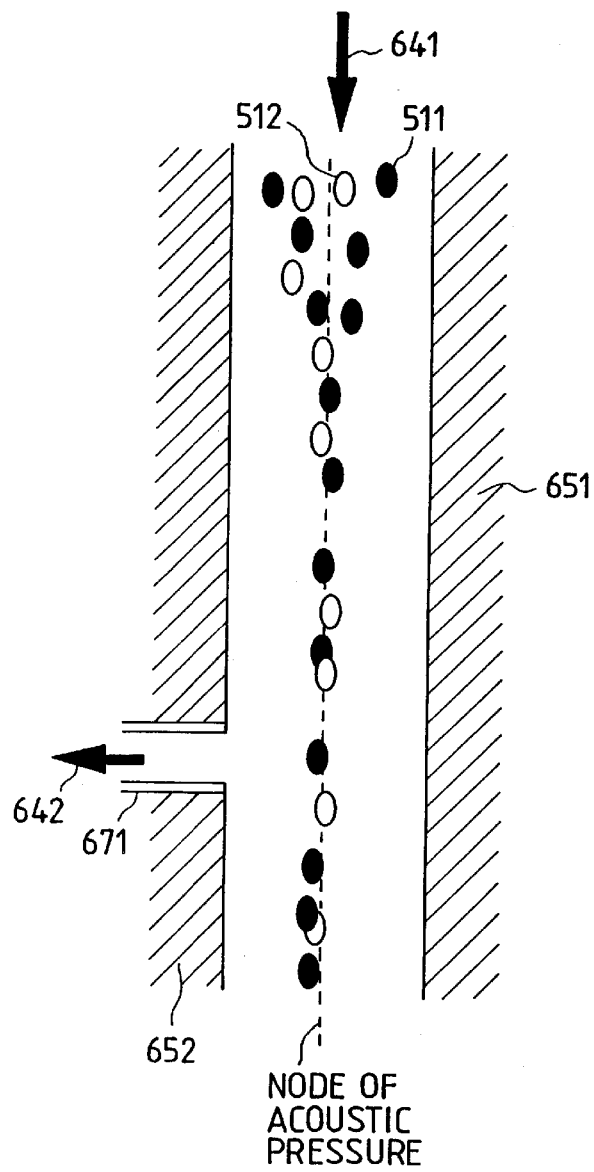
FIG. 22 is a view for describing a process of concentrating and separating particles by the ultrasonic chamber shown in FIG. 21.

Further, an ultrasonic chamber can be longitudinally placed as shown in FIG. 21 so that the direction of a solution flowing in the ultrasonic chamber coincides with the direction of gravity. A process of concentrating and separating particles by the ultrasonic chamber at this time, is illustrated in FIG. 22. Thus, the longitudinal provision of the ultrasonic chamber can prevent settlement and deposition of the particles to the bottom of a channel by gravity subjected to the particles.

Figure 23:
FIG. 23 discloses effects of input voltage waveforms of ultrasound irradiated in the chamber under three conditions, wherein (a) shows the micrograph of red blood cells in the chamber without ultrasound irradiation, (b) shows that 500 kHz sine wave ultrasound irradiated and (c) shows that rectangular wave ultrasound irradiated and (d), (e) and (f) show each wave form of input voltage corresponding to (a), (b) and (c).
Figure 23:
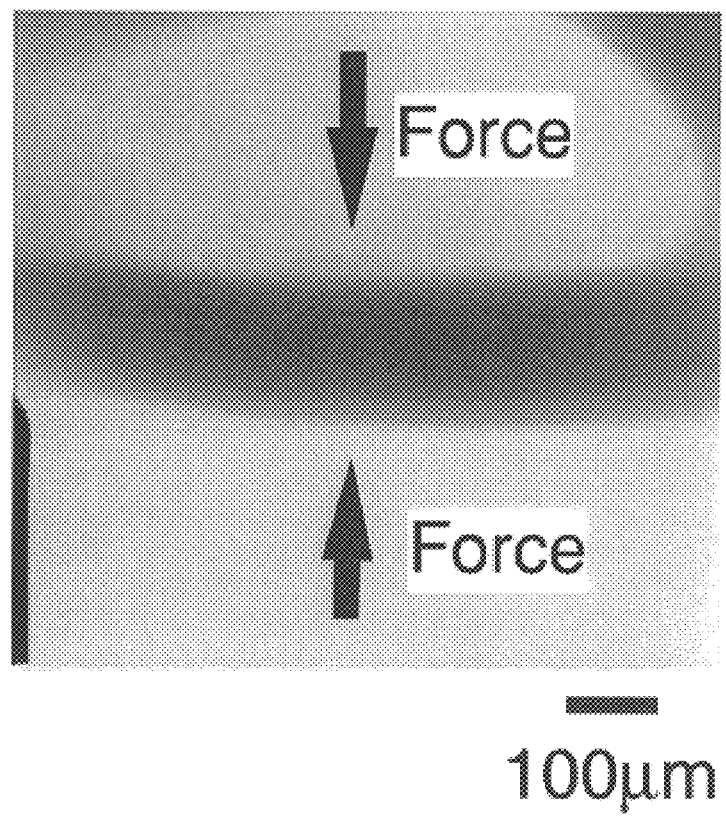
Figure 23:
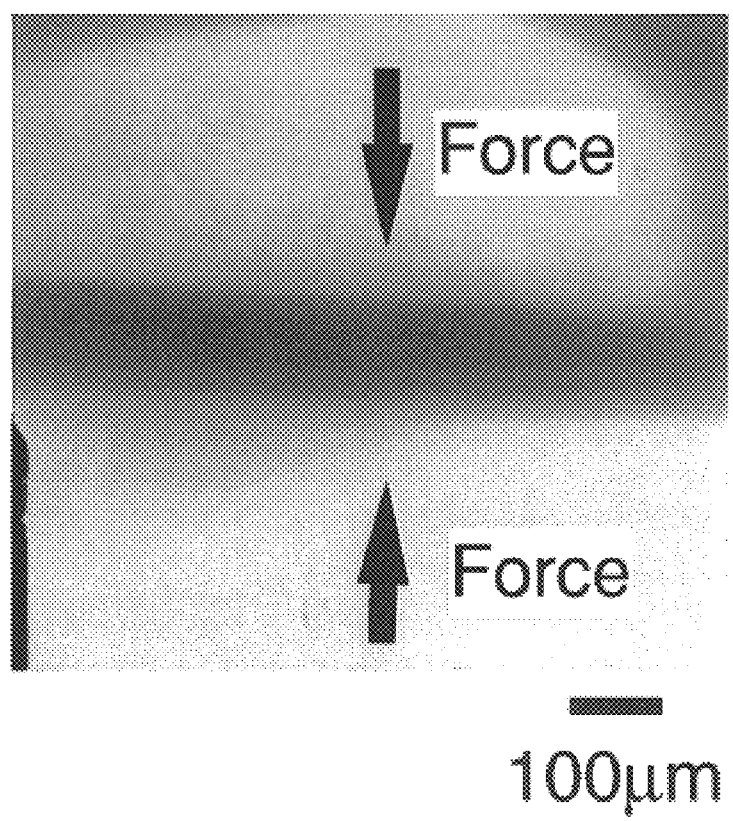

FIG. 23 discloses effects of input voltage waveforms of ultrasound irradiated in the chamber under three conditions, wherein (a) shows the micrograph of red blood cells in the chamber without ultrasound irradiation, (b) shows that 500 kHz sine wave ultrasound irradiated and (c) shows that rectangular wave ultrasound irradiated and (d), (e) and (f) show each wave form of input voltage corresponding to (a), (b) and (c). As shown in FIG. 23, it is clear rectangular voltage input into the transducers improves the concentration of small particles at the pressure node.

As has been described above in detail, the present invention can bring about an advantageous effect that particles in a fluid can be effectively concentrated, filtrated, recovered or separated. Further, the present invention can bring about another advantageous effect that the particles which exist in the fluid, can be periodically arranged. Furthermore, the present invention can bring about a further advantageous effect that a solvent component in a solution containing particles can be continuously replaced with another without particle components being reduced.

Having now fully described the invention, it will be apparent to those skilled in the art that many changes and modifications can be made without departing from the spirit or scope of the invention as set forth herein.

We claim:

1. A particle method by an acoustic radiation force, comprising the steps of:

generating an ultrasound beam by applying a plurality of superimposed alternating electric voltages having sinusoidal shapes different from one another to a piezoelectric transducer;

applying the generated ultrasound beam to a fluid containing particles in a chamber to be concentrated, filtered or arranged so as to apply a force to the particles; and varying the force applied to the particles from a force forwarded in a predetermined direction to a force staying at a predetermined region.

2. An apparatus for handling particles by an acoustic radiation force, comprising:

a chamber for accommodating therein a fluid containing the particles to be concentrated, filtrated or arranged;

an ultrasound source disposed so as to make direct or indirect contact with the fluid; and a control device for controlling said ultrasound source to generate an ultrasound beam by applying a plurality of superimposed alternating electric voltages having sinusoidal shapes differing from one another to said ultrasound source so that the generated ultrasound beam exerts a force forwarded in a predetermined direction or a force staying at a predetermined region on the particles within a sound field of the fluid.

3. An apparatus as claimed in claim 2, further comprising an amplifier having a function of amplifying by $\omega'/\omega$ times, the amplitude of a voltage vibration of an input angular frequency $\omega'$ with respect to the amplitude of a voltage vibration of a reference angular frequency $\omega$.

4. An apparatus as claimed in claim 2, further comprising means for controlling the temperature of the fluid in the chamber for holding the fluid therein.

5. An apparatus for handling particles by an acoustic radiation force, comprising:

a chamber for accommodating therein a fluid containing the particles to be concentrated filtrated or arranged; a plurality of ultrasound sources each disposed so as to make direct or indirect contact with the fluid; and a control device for controlling said ultrasound sources independently of each other to generate respective ultrasound beams each having a specific frequency, a specific intensity and a specific phase difference;

whereby the ultrasound beams from said ultrasound sources exert a force forwarded in a predetermined direction or a force staying at a predetermined region on the particles within a sound field of the fluid;

wherein the ultrasound beams generated from said plurality of ultrasound sources produce a standing wave; and means for controlling the temperature of the fluid in the chamber for holding the fluid therein.

6. An apparatus for handling particles by an acoustic radiation force, comprising:

a chamber for accommodating therein a fluid containing the particles to be concentrated, filtrated or arranged;

an ultrasound source disposed so as to make direct or indirect contact with the fluid;

a control device for controlling said ultrasound source to generate an ultrasound beam by applying a plurality of superimposed alternating electric voltage having sinusoidal shapes differing from one another to said ultrasound source; and means for exerting at least one of an electric field, a magnetic field and an other external force which is other than the acoustic radiation force on a sample in the apparatus;

whereby the ultrasound beams from said ultrasound beam exerts a force forwarded in a predetermined direction or a force staying at a predetermined region on the particles within a sound field of the fluid.

7. An apparatus as claimed in claim 6, wherein means for observing the state of the particles in the fluid is provided at a position where the particles in the fluid are concentrated or on a side downstream from the position.

8. An apparatus as claimed in claim 6, wherein said control device controls intensities, phases and frequencies produced from said ultrasound sources, or the degree of superimposition of respective intensities, phases and frequencies on one another, or other external force other than the ultrasound beams, based on a distribution of the particles in the fluid, which has been obtained by said observing means.

9. An apparatus for handling particles by an acoustic radiation force, comprising:

chamber for accommodating therein a fluid containing the particles to be concentrated filtrated or arranged;

a plurality of ultrasound sources each disposed so as to make direct or indirect contact with the fluid;

a control device for controlling said ultrasound sources to generate an ultrasound beam obtained by superimposing ultrasound beams each having a specific frequency, a specific intensity and a specific phase difference from said ultrasound sources on one another; and means for exerting at least one of an electric field, a magnetic field and an other external force which is other than the acoustic radiation force on a sample in the apparatus;

whereby the ultrasound beams from said ultrasound sources exert a force forwarded in a predetermined direction or a force staying at a predetermined region on the particles within a sound field of the fluid; and wherein a tube is provided at a position for sucking concentrated particles in the fluid on a downstream side of said tube together with the fluid, or a tube is provided for sucking the fluid on a downstream side of said tube at a position other than a position where the particles have been concentrated.

10. An apparatus as claimed in claim 9, further comprising means for displacing the position of said tube.

11. An apparatus as claimed in claim 9, wherein means for observing the state of the particles in the fluid is provided at the position where the particles in the fluid are concentrated or on the side downstream from the position.

12. An apparatus as claimed in claim 9, wherein said control device controls intensities, phases and frequencies produced from said ultrasound sources, or the degree of superimposition of these respective ones on one another, or other external force other than the ultrasound beams, based on a distribution of the particles in the fluid, which has been obtained by said observing means.

13. A particle handling apparatus comprising:

a channel for passing a solution containing solvent components and particle components therethrough;

means for applying an ultrasound beam in a direction substantially orthogonal to a flow of the solution in the channel to thereby generate a node of acoustic pressure of a standing wave at a predetermined position in the channel; and a suction hole defined in a wall surface of said channel substantially orthogonal to the flow of the solution in the channel and having a diameter smaller than a wavelength of the ultrasound beam.

14. A particle handling apparatus as claimed in claim 13, wherein said means controls the frequency, phase and intensity of an ultrasound beam produced from each of ultrasound sources, which acts on at least opposed wall surfaces.

15. An apparatus as claimed in claim 13, wherein said means for applying the ultrasound beam includes means for superimposing ultrasound beams each having specific frequency, a specific intensity and a specific phase difference from ultrasound sources on one another, so that the ultrasound beams from said ultrasound sources exert a force forwarded in a predetermined direction or a force staying at a predetermined region on the particles within a sound field of the fluid.

16. An apparatus as claimed in claim 15, wherein said means for applying the ultrasound beam including means for varying at least one of the specific frequencies, intensities and phase differences of the ultrasound beams from said ultrasound source independently of each other according to time so that the predetermined region is changed according to time.

17. A particle handling apparatus comprising:

a channel for passing a solution containing solvent components and particle components therethrough;

means for applying an ultrasound beam in a direction substantially orthogonal to a flow of the solution in the channel to thereby generate a node of acoustic pressure of a standing wave at a predetermined position in the channel; and suction holes respectively defined in wall surfaces of said channel, substantially orthogonal to the flow of the solution in the channel and opposed to each other and having diameters smaller than wavelength of the ultrasound beam;

said wall surfaces having said holes are conductive or are of a magnetic material and are capable of applying a force produced by an electric field or magnetic field other than a force produced by the ultrasound beam to said each particle.

18. A particle handling apparatus as claimed in claim 17, wherein said means controls the frequency, phase and intensity of an ultrasound beam produced from each of ultrasound sources, which acts on at least the opposed wall surfaces.

19. A particle handling apparatus comprising:

a channel for passing a solution containing solvent components and particle components therethrough;

means for applying an ultrasound beam in a direction substantially orthogonal to a flow of the solution in the channel to thereby generate a node of acoustic pressure of a standing wave at a predetermined position in the channel;

a first solution supply port defined in a wall surface of said channel, substantially orthogonal to the flow of the solution in the channel and having a diameter smaller than the wavelength of the ultrasound beam, said port being used to supply a reaction solution which acts on the particles;

a second solution supply port defined in the wall surface of said channel and having a diameter smaller than the wavelength of the ultrasound beam, said port being used to supply a dilute solution for diluting a reaction solution to the side downstream from said first solution supply port; and a suction hole provided at a position opposed to said second solution supply port or defined in the wall surface of said channel on the side downstream from said second solution supply port, said suction hole having a diameter smaller than a wavelength of the ultrasound beam.

20. A particle handling apparatus as claimed in claim 19, wherein said means controls the frequency, phase and intensity of an ultrasound beam produced from each of ultrasound sources, which acts on at least opposed wall surfaces.

21. A particle handling apparatus as claimed in claim 19, further comprising a stirrer provided on the side downstream from said first solution supply port and used to promote a contact between the reaction solution and the particles.

22. An apparatus as claimed in claim 19, wherein said means for applying the ultrasound beam including means for superimposing ultrasound beams each having a specific frequency, a specific intensity and a specific phase difference from ultrasound sources on one another, so that the ultrasound beams from said ultrasound sources exert a force forwarded in a predetermined direction or a force staying at a predetermined region on the particles within a sound field of the fluid.

23. An apparatus as claimed in claim 22, wherein said means for applying the ultrasound beam includes means for varying at least one of the specific frequencies, intensities and phase differences of the ultrasound beams from said ultrasound sources independently of each other according to time, so that the predetermined region is changed according to time.

24. A particle handling apparatus comprising:

a chamber for holding therein a sample solution containing dissolved gas components, solvent components and particle components;

degassing means supplied with the sample solution, for removing dissolved gas components in the solution;

a channel for passing the degassed sample solution therethrough;

means for applying an ultrasound beam in a direction substantially orthogonal to a flow of the solution in the channel to thereby generate a node of acoustic pressure of a standing wave at a predetermined position in the channel;

at least one suction hole defined in a channel wall surface substantially orthogonal to the flow of the solution in the channel and having a diameter smaller than a wavelength of the ultrasound beam;

a changeover valve for changing the flow of the solvent components or the particle components sucked through said suction hole;

a changeover valve for changing the flow of the solvent components or the particle components unsucked through said suction hole;

pipes for discharging the solvent components or the particle components through said their corresponding valves;

pipes for returning the solvent components or particle components to the tube through said their corresponding valves; and a control device for controlling said respective elements.

25. A particle handling apparatus as claimed in claim 24, wherein a generating means controls the frequency, phase and intensity of an ultrasound beam produced from each of ultrasound sources, which acts on at least opposed wall surfaces.

26. An apparatus as claimed in claim 24, wherein said means for applying the ultrasound beam includes means for superimposing ultrasound beams each having a specific frequency, a specific intensity and a specific phase difference from ultrasound sources on one another, so that the ultrasound beams from said ultrasound sources exert a force forwarded in a predetermined direction or a force staying at a predetermined region on the particles within a sound field of the fluid.

27. An apparatus as claimed in claim 26, wherein said means for applying the ultrasound beam includes means for varying at least one of the specific frequencies, intensities and phase differences of the ultrasound beams from said ultrasound sources independently of each other according to time so that the predetermined region is changed according to time.

28. An apparatus for handling particles by an acoustic radiation force, comprising:

a chamber for accommodating therein a fluid containing the particles to be separated;

a plurality of ultrasound sources disposed so as to make direct or indirect contact with the fluid;

a control device for controlling said ultrasound sources to generate an ultrasound beam; and means for exerting an electric field, the electric field being generated by electrode plates attached to faces of said ultrasound sources in said chamber;

wherein an acoustic radiation force and an electrostatic force are both irradiated simultaneously from a same inner face of said chamber in a same direction and separate different kinds of particles in the fluid; and wherein a tube is provided at a position for sucking particles in the fluid on a downstream side of said tube together with the fluid, or a tube is provided for sucking the fluid on a downstream side of said tube at a position other than a position where the particles have been concentrated.

* * * * *